(12) United States Patent
Akai et al.

(10) Patent No.: US 12,138,980 B2
(45) Date of Patent: Nov. 12, 2024

(54) SENSORY EVALUATION PREDICTION SYSTEM, SUSPENSION DEVICE, AND SUSPENSION CONTROL SYSTEM

(71) Applicant: Hitachi Astemo, Ltd., Hitachinaka (JP)

(72) Inventors: Akihito Akai, Tokyo (JP); Nobuyuki Ichimaru, Hitachinaka (JP); Ryusuke Hirao, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 232 days.

(21) Appl. No.: 17/795,285

(22) PCT Filed: Dec. 25, 2020

(86) PCT No.: PCT/JP2020/048660
§ 371 (c)(1),
(2) Date: Jul. 26, 2022

(87) PCT Pub. No.: WO2021/153128
PCT Pub. Date: Aug. 5, 2021

(65) Prior Publication Data
US 2023/0143565 A1    May 11, 2023

(30) Foreign Application Priority Data

Jan. 28, 2020    (JP) ................. 2020-011277

(51) Int. Cl.
*B60G 17/018* (2006.01)
(52) U.S. Cl.
CPC ...... *B60G 17/0182* (2013.01); *B60G 2400/05* (2013.01); *B60G 2400/41* (2013.01);
(Continued)

(58) Field of Classification Search
CPC ............ B60G 17/0182; B60G 2400/05; B60G 2400/41; B60G 2400/42; B60G 2600/182; B60G 2600/70
See application file for complete search history.

(56) References Cited

U.S. PATENT DOCUMENTS

2015/0239442 A1    8/2015    Yamakado et al.
2017/0361672 A1*   12/2017   Ahmadian ........... B60G 17/019
(Continued)

FOREIGN PATENT DOCUMENTS

JP    5-16634 A    1/1993
JP    7-244065 A   9/1995
(Continued)

OTHER PUBLICATIONS

International Search Report (PCT/ISA/210) issued in PCT Application No. PCT/JP2020/048660 dated Feb. 16, 2021 with English translation (five (4) pages).
(Continued)

*Primary Examiner* — George C Jin
(74) *Attorney, Agent, or Firm* — Crowell & Moring LLP

(57) ABSTRACT

A sensory evaluation prediction system includes an input unit that reads an output from a behavior sensor that measures two or more types of pieces of time series information regarding a moving body, a selection unit that selects two or more types of physical quantities from the output from the behavior sensor read by the input unit, a correlation creation unit that creates information showing a correlation in time series between the two or more types of the physical quantities selected by the selection unit, and an evaluation circuit that calculates an evaluation value of a sensory index based on the information showing the correlation in time series.

12 Claims, 18 Drawing Sheets

(52) U.S. Cl.
CPC .... *B60G 2400/42* (2013.01); *B60G 2600/182* (2013.01); *B60G 2600/70* (2013.01)

(56) References Cited

U.S. PATENT DOCUMENTS

| | | | |
|---|---|---|---|
| 2018/0170391 A1 | 6/2018 | Duvernier et al. | |
| 2021/0107385 A1* | 4/2021 | Kuretake | B60N 2/502 |
| 2022/0234409 A1* | 7/2022 | Lucas | B60G 17/0182 |
| 2022/0396113 A1* | 12/2022 | Kim | B60G 17/0165 |
| 2023/0081873 A1* | 3/2023 | Ericksen | B60G 17/019 |
| | | | 280/5.515 |
| 2023/0311609 A1* | 10/2023 | Bensaid | B60W 50/0097 |
| | | | 701/37 |

FOREIGN PATENT DOCUMENTS

| | | |
|---|---|---|
| JP | 2007-261486 A | 10/2007 |
| JP | 2014-69766 A | 4/2014 |
| JP | 2015-161587 A | 9/2015 |
| JP | 2018-517978 A | 7/2018 |
| JP | 2018-165070 A | 10/2018 |

OTHER PUBLICATIONS

Japanese-language Written Opinion (PCT/ISA/237) issued in PCT Application No. PCT/JP2020/048660 dated Feb. 16, 2021 (three (3) pages).
Korean-language Office Action issued in Korean Application No. 10-2022-7026004 dated Nov. 28, 2023 with English translation (15 pages).

\* cited by examiner

FIG. 2

| | bit | SENSORY INDEX |
|---|---|---|
| SENSORY INDEX SETTING REGISTER | 0 | N RESPONSE |
| | 1 | YAW RESPONSE |
| | 2 | GRIP FEELING |
| | 3 | ROLL FEELING |
| | 4 | STRAIGHTNESS |
| | 5 | LINEARITY |
| | ⋮ | |
| | m | |

| | bit | PHYSICAL VALUE |
|---|---|---|
| DATA GROUP COMBINATION SETTING REGISTER 1 | 0 | STEERING TORQUE |
| | 1 | STEERING ANGLE |
| | 2 | PITCH RATE |
| | 3 | ROLL RATE |
| | 4 | YAW RATE |
| | 5 | PITCH ANGLE |
| | 6 | ROLL ANGLE |
| | 7 | YAW ANGLE |
| | 8 | LATERAL ACCELERATION |
| | 9 | LATERAL JERK |
| | ⋮ | |
| | n | |

113

FIG. 5
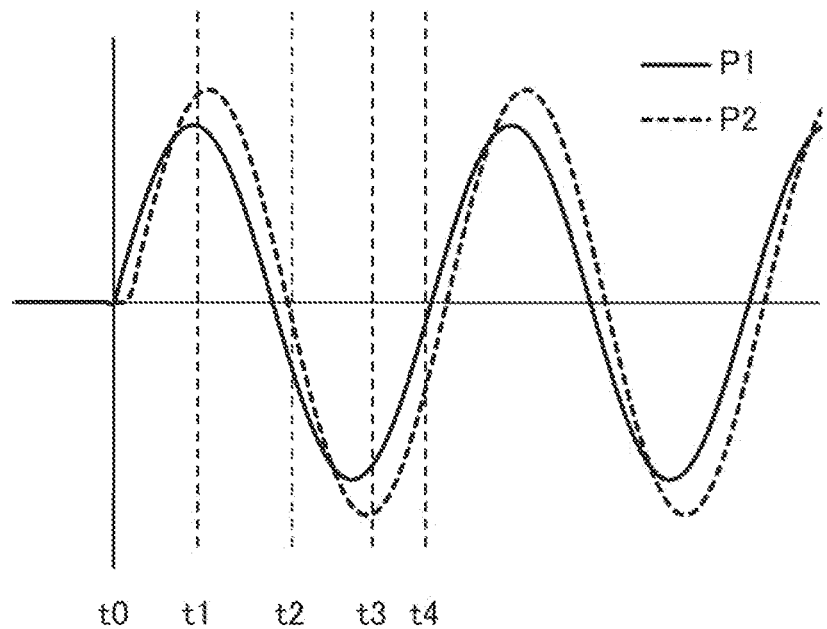
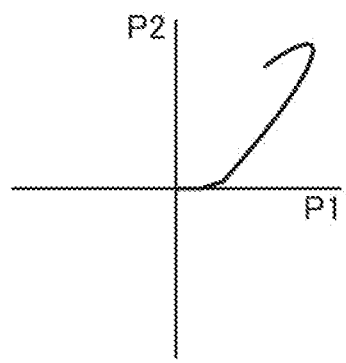
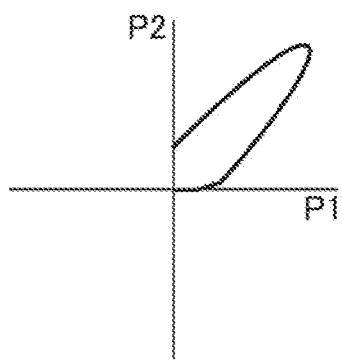
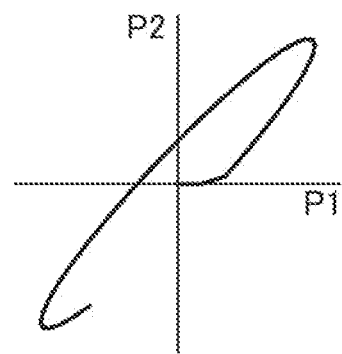
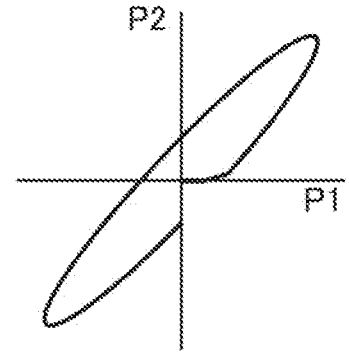

| NN OUTPUT | SENSORY INDEX VALUE |
|---|---|
| a31 | 8.00 |
| a32 | 7.75 |
| a33 | 7.50 |
| a34 | 7.25 |
| a35 | 7.00 |
| a36 | 6.75 |
| ⋮ | ⋮ |
| a3K | 4.00 |

(EXAMPLE) K = 17

PIXEL DATA → i=1, 2, TO, I+1
j=1, 2, TO, j+1
k=1, 2, TO k

| SENSORY INDEX | P1 | P2 | NUMBER OF HIDDEN LAYER ELEMENTS (J) | NUMBER OF OUTPUT LAYER ELEMENTS (K) |
|---|---|---|---|---|
| N RESPONSE | STEERING TORQUE | STEERING ANGLE | 100 | 17 |
| YAW RESPONSE | STEERING ANGLE | YAW RATE | 200 | 17 |
| GRIP FEELING | YAW RATE | LATERAL ACCELERATION | 250 | 17 |
| ⋮ | | | ⋮ | ⋮ |
| ROLL FEELING | LATERAL JERK | ROLL RATE | 500 | 17 |

…
SENSORY EVALUATION PREDICTION SYSTEM, SUSPENSION DEVICE, AND SUSPENSION CONTROL SYSTEM

TECHNICAL FIELD

The present invention relates to a sensory evaluation prediction system, a suspension device, and a suspension control system.

BACKGROUND ART

In an automobile, a vibration stimulus input from a road surface is transmitted to a vehicle occupant via a tire, a suspension, a chassis, a seat rail, a seat leg, and a sheet material. It is mainly important in ride quality sensory evaluation that how a driver and the vehicle occupant feels about this vibration stimulus. Additionally, in steering stability sensory evaluation, a reaction when a steering is operated, a comfort of response, and presence/absence of uncomfortable feeling are mainly important. In an automobile manufacturer, there is a ride quality targeted by each of automobile manufacturers, steering stability, and a balance between them, and the ride quality and the steering stability have been improved by conveying improvements from trained expert drivers to persons in charge of design of vehicle components and adjustment of parameters. Patent Literature 1 discloses a motion evaluation method that detects at least a jerk found by differentiating an acceleration of an object in motion, inputs the detected jerk to an input layer in a hierarchical neural network, and outputs a motion evaluation result from an output layer via a middle layer.

CITATION LIST

Patent Literature

Patent Literature 1: Japanese Unexamined Patent Application Publication No. Hei 7(1995)-244065

SUMMARY OF INVENTION

Technical Problem

The invention described in Patent Literature 1 has room for improvement in handling of a variation in an operation depending on a driver.

Solution to Problem

A sensory evaluation prediction system according to a first aspect of the present invention includes an input unit, a selection unit, a correlation creation unit, and an evaluation circuit. The input unit reads an output from a behavior sensor that measures two or more types of pieces of time series information regarding a moving body. The selection unit selects two or more types of physical quantities from the output from the behavior sensor read by the input unit. The correlation creation unit creates information showing a correlation in time series between the two or more types of the physical quantities selected by the selection unit. The evaluation circuit calculates an evaluation value of a sensory index based on the information showing the correlation in time series.

A suspension device according to a second aspect of the present invention is manufactured based on the evaluation value output from the above-described sensory evaluation prediction system.

A suspension control system according to a third aspect of the present invention includes the above-described sensory evaluation prediction system and a suspension damping force variable mechanism that adjusts a damping force of a suspension device mounted on the moving body based on the evaluation value output from the sensory evaluation prediction system.

Advantageous Effects of Invention

According to the present invention, since the correlation between a plurality of the physical quantities is evaluated, a variation in an operation depending on a driver is less likely to be affected.

BRIEF DESCRIPTION OF DRAWINGS

FIG. 2 is a drawing illustrating an exemplary sensory index setting.

FIG. 3 is a drawing illustrating an exemplary data specification setting.

FIG. 5 is a conceptual diagram illustrating creation of correlation information showing a correlation between two physical quantities.

FIG. 10(*a*) is a diagram illustrating a relationship between an input layer, a hidden layer, and an output layer in the hierarchical neural network. FIG. 10(*b*) is a drawing illustrating an exemplary relationship between the sensory index, two physical quantities for evaluation, the number of hidden layer elements, and the number of output layer elements.

DESCRIPTION OF EMBODIMENTS

First Embodiment

The following will describe a first embodiment of a sensory evaluation prediction system with reference to FIG. 1 to FIG. 14. The sensory evaluation prediction system described below may be mounted on a vehicle or may be installed outside a vehicle.

Figure 1:
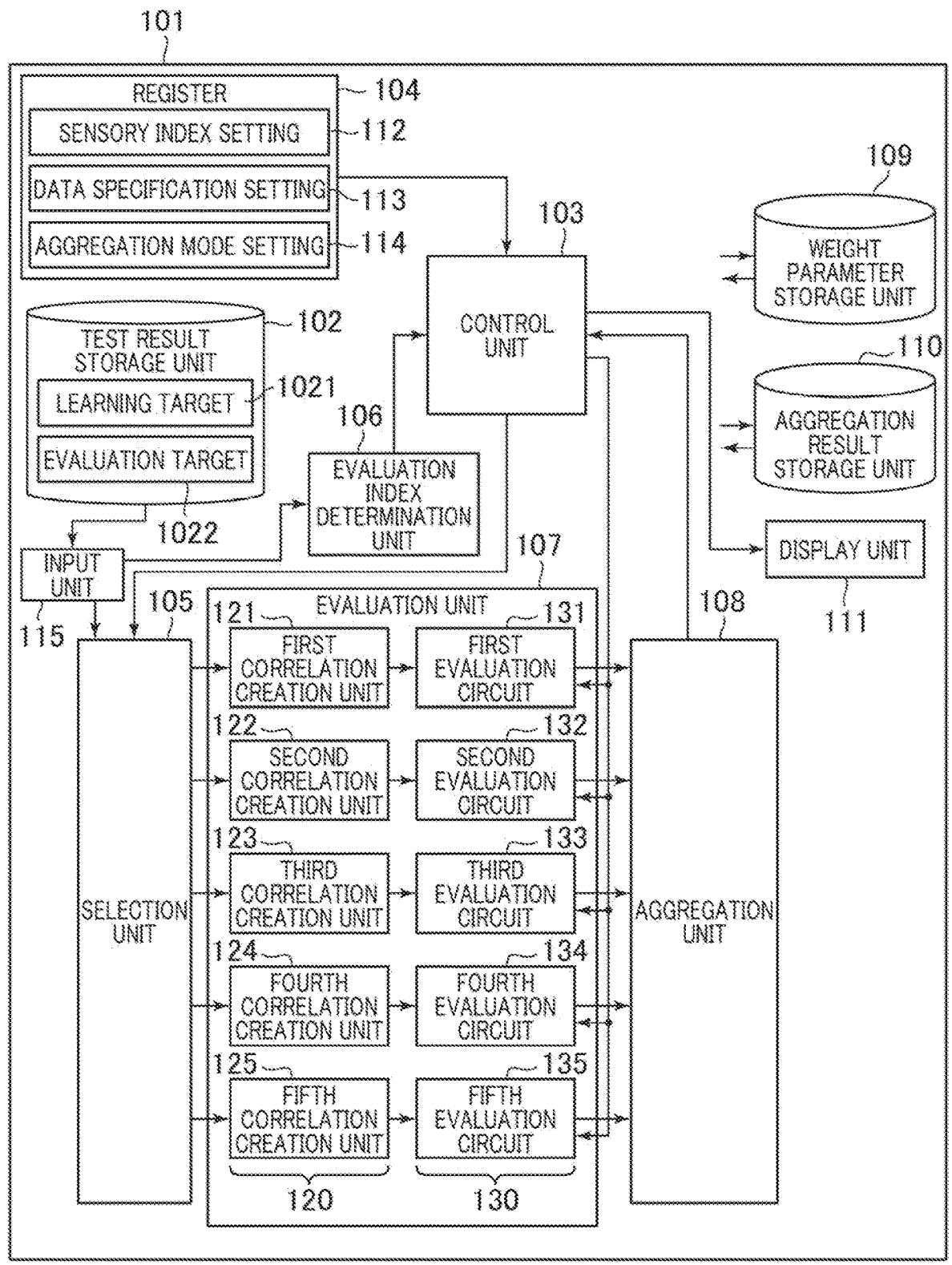
FIG. 1 is a block diagram of a sensory evaluation prediction system in a first embodiment.

FIG. 1 is a block diagram of a sensory evaluation prediction system 101 in the first embodiment. The sensory evaluation prediction system 101 includes a test result storage unit 102, a control unit 103, a register 104, a selection unit 105, an evaluation index determination unit 106, an evaluation unit 107, an aggregation unit 108, a weight parameter storage unit 109, an aggregation result storage unit 110, a display unit 111, and an input unit 115. The register 104 includes a sensory index setting 112, a data specification setting 113, and an aggregation mode setting 114. The evaluation unit 107 includes a first correlation creation unit 121, a second correlation creation unit 122, a third correlation creation unit 123, a fourth correlation creation unit 124, a fifth correlation creation unit 125, a first evaluation circuit 131, a second evaluation circuit 132, a third evaluation circuit 133, a fourth evaluation circuit 134, and a fifth evaluation circuit 135.

The first correlation creation unit 121 creates first correlation information and inputs it to the first evaluation circuit 131. The second correlation creation unit 122 creates second correlation information and inputs it to the second evaluation circuit 132. The third correlation creation unit 123 creates third correlation information and inputs it to the third evaluation circuit 133. The fourth correlation creation unit 124 creates fourth correlation information and inputs it to the fourth evaluation circuit 134. The fifth correlation creation unit 125 creates fifth correlation information and inputs it to the fifth evaluation circuit 135.

Hereinafter, the first correlation creation unit 121, the second correlation creation unit 122, the third correlation creation unit 123, the fourth correlation creation unit 124, and the fifth correlation creation unit 125 will be collectively referred to as a correlation creation unit 120. Hereinafter, the first evaluation circuit 131, the second evaluation circuit 132, the third evaluation circuit 133, the fourth evaluation circuit 134, and the fifth evaluation circuit 135 will be collectively referred to as an evaluation circuit 130. Hereinafter, the first correlation information, the second correlation information, the third correlation information, the fourth correlation information, and the fifth correlation information will be collectively referred to as correlation information.

Respective sensory indices evaluated by the five evaluation circuits 130 are a neutral (N) response, a yaw response, a grip feeling, a roll feeling, and a straightness. However, these are merely an example, and the evaluation circuit 130 may evaluate a sensory index other than the above-described sensory indices. The number of sensory indices evaluated by the evaluation circuit 130 only needs to be two or more, and the number does not have an upper limit. FIG. 1 illustrates an example in which the evaluation unit 107 evaluates the five sensory indices, and according to the number of sensory indices to be evaluated, the numbers of the correlation creation units 120 and the evaluation circuits 130 increase and decrease.

The control unit 103, the selection unit 105, the evaluation index determination unit 106, the evaluation unit 107, and the aggregation unit 108 perform calculations. These calculations are achieved by, for example, reading a program from a ROM (not illustrated), expanding it to a RAM (not illustrated), and executing it by a CPU (not illustrated). However, these calculations may be achieved by a Field Programmable Gate Array (FPGA) as a rewritable logic circuit (JIS) and an Application Specific Integrated Circuit (ASIC) as an integrated circuit for a specific application. Instead of the combination of the CPU, the ROM, and the RAM, these calculations may be achieved by a combination of different configurations, for example, a combination of a CPU, a ROM, a RAM, and an FPGA.

The test result storage unit 102, the register 104, the weight parameter storage unit 109, and the aggregation result storage unit 110 are non-volatile storage devices, and each of them can be referred to as a "storage unit." However, at least one of the test result storage unit 102, the register 104, the weight parameter storage unit 109, and the aggregation result storage unit 110 may be a volatile storage device, and in this case, information read from a non-volatile storage device (not illustrated) at the start of the sensory evaluation prediction system 101 is stored in the volatile storage device. The display unit 111 is, for example, a liquid crystal display, and displays a video signal output from the control unit 103. The input unit 115 is a connection interface with the test result storage unit 102.

The test result storage unit 102 stores a learning target 1021 and an evaluation target 1022. The learning target 1021 is a combination of sensor data acquired by a sensor group mounted on an evaluated vehicle in which an expert driver gets and the sensory indices by the expert driver at the time. The sensor group will be described later with reference to FIG. 4. The learning target 1021 is used to calculate a weight parameter stored in the weight parameter storage unit 109 as described later. Note that the evaluation unit 107 refers to the weight parameter storage unit 109. The evaluation target 1022 is sensor data acquired by the sensor group mounted on the evaluated vehicle. The evaluation target 1022 is evaluated by the evaluation unit 107.

The control unit 103 has a function that causes respective blocks constituting the sensory evaluation prediction system 101 to cooperatively operate. That is, although the control unit 103 involves all processes described later, for simplification of description, the involvement of the control unit 103 in the process will not be especially described below. Note that the control unit 103 has a function that stops the evaluation circuit 130 that need not operate based on the output from the evaluation index determination unit 106. For example, when the evaluation index determination unit 106 selects only the N response, the second evaluation circuit 132 to the fifth evaluation circuit 135 are stopped.

The sensory index setting 112 included in the register 104 is a register in which the sensory index displayed in the display unit 111 is set. Any given value is preliminarily set to the sensory index setting 112. However, the sensory index setting 112 may be settable from outside the sensory evaluation prediction system 101.

FIG. 2 is a drawing illustrating the exemplary sensory index setting 112. Here, the sensory index setting 112 is constituted of m bits, for example, 5 bits, and the sensory index is assigned to each bit. The evaluation index determination unit 106 sets "1" to the bit corresponding to the sensory index as the evaluation target, and sets "0" to bits other than the bit. Note that FIG. 2 is merely an example, and as long as the similar setting is possible, any data format may be used for the sensory index setting 112. Returning to FIG. 1, the description will be continued.

The data specification setting 113 included in the register 104 is a register in which data used for the respective sensory indices, that is, specifications of combinations of sensor outputs are set. In this embodiment, the data specification setting 113 is not changed.

FIG. 3 is a drawing illustrating the exemplary data specification setting 113. The data specification setting 113 is constituted of tables by the same number of the sensory indices, for example, m tables, and n-bit information is stored in each table. Sensor information stored in the test result storage unit 102, namely, a physical quantity is assigned to each bit in each table. That is, "1" is set to the bit corresponding to the physical quantity used to calculate the corresponding sensory index, and "0" is set to bits other than the bit. Note that FIG. 3 is merely an example, and as long as the similar setting is possible, any data format is used for the data specification setting 113. Returning to FIG. 1, the description will be continued.

The aggregation mode setting 114 included in the register 104 is setting information that indicates which of an instantaneous value and an average value is output from the evaluation unit 107 and to be displayed in the display unit 111. The aggregation unit 108 reads the aggregation mode setting 114. The selection unit 105 outputs at least a part of the evaluation target 1022 read from the test result storage unit 102 by the input unit 115 to the respective correlation creation units 120. The selection unit 105 refers to the output from the evaluation index determination unit 106 received via the control unit 103 and the data specification setting 113 to determine which of the data included in the evaluation target 1022 is output.

The evaluation index determination unit 106 selects the sensory index to perform sensory evaluation prediction based on an operating situation of steering. One idea is that the operating situation of steering is defined based on ISO 13674-1/2 (Road vehicles—Test method for the quantification of on-centre handling Part 1/2) regulating a testing method of a test run for steering stability. For example, when the evaluation index determination unit 106 determines that a Weave test including continuous S-shaped curves, what is called a slalom run, is performed based on the operating situation of steering, the evaluation index determination unit 106 determines the N response, the yaw response, the grip feeling, and the roll feeling as the evaluation target, and excludes the straightness from the evaluation target. For example, when the evaluation index determination unit 106 determines that straight traveling is performed, the evaluation index determination unit 106 determines the N response and the straightness as the evaluation target, and excludes the yaw response, the grip feeling, and the roll feeling from the evaluation target. The operating situation of steering is, for example, any of a steering position, a steering speed as differentiation of the steering position, and a steering acceleration as differentiation of the steering speed. Hereinafter, information indicative of the operating situation of steering is referred to as steering information in some cases.

An operation pattern of steering assumed by the evaluation index determination unit 106 includes Step steer as a pattern of a stepwise steering operation in which straight traveling is performed for a certain period and then a regulated steering angle is maintained, and the sensory index corresponding to this operation pattern is preliminarily determined. When the steering operation is reworded with the sensory index as a reference, a steering operation assumed for each sensory index is present. Accordingly, the steering information referred to by the evaluation index determination unit 106 is the operating situation of steering during traveling, and the sensory evaluation prediction system 101 determines the sensory index for sensory evaluation prediction based on this. Note that the determination of the sensory index only needs to group the above-described defined operating situations of steering including a difference in parameter, such as a vehicle speed, and to ensure determination, and, for example, pattern matching of steering angle data of steering can be used.

The evaluation unit 107 includes the correlation creation unit 120 and the evaluation circuit 130. Using two or more types of physical quantities transferred from the selection unit 105, the correlation creation unit 120 creates correlation information as information showing a correlation in time series between the physical quantities. In the creation method of the correlation information by each of the correlation creation units 120, for example, the types of physical quantities used for creation, scaling setting, and an order of data used may be the same or may be different.

The aggregation unit 108 aggregates the sensory index values output by the evaluation circuit 130. As described above, since the steering operation as the evaluation target is present for each of the sensory indices, when traveling is performed by a steering operation out of the target, the evaluation circuit 130 possibly fails to output the appropriate sensory index value. Therefore, based on the determination result by the evaluation index determination unit 106, the process is performed on the sensory index value output by the evaluation circuit 130 only when the traveling is performed by the steering operation as the evaluation target. When the traveling is performed by the steering operation out of the evaluation target, the sensory index value output by the evaluation circuit 130 is eliminated. The aggregation unit 108 determines the necessity for elimination of the calculation result for each sensory index and writes the sensory index value that has not been eliminated to the aggregation result storage unit 110 together with a time stamp.

The weight parameter storage unit 109 stores the parameter used by the evaluation circuit 130. Since the five types of sensory indices are assumed in this embodiment, the weight parameter storage unit 109 has a capacity of ensuring storing at least five sets of parameters. Note that the parameter here is, for example, a coefficient of a calculation formula used by the evaluation circuit 130 and a weight Wij of connection between elements, for example, when the evaluation circuit 130 is achieved by a hierarchical neural network.

The display unit 111 presents the sensory index value stored in the aggregation result storage unit 110 to the vehicle occupant in the vehicle. Note that the sensory index output from the display unit 111 is selectable, and is selectable from outside with the sensory index setting 112 included in the register 104. Additionally, as the sensory index value output by the display unit 111, any of the instantaneous value or the average value in a traveling period is selectable, and the sensory index value can be set from outside with the aggregation mode setting 114 included in the register 104.

Figure 4:
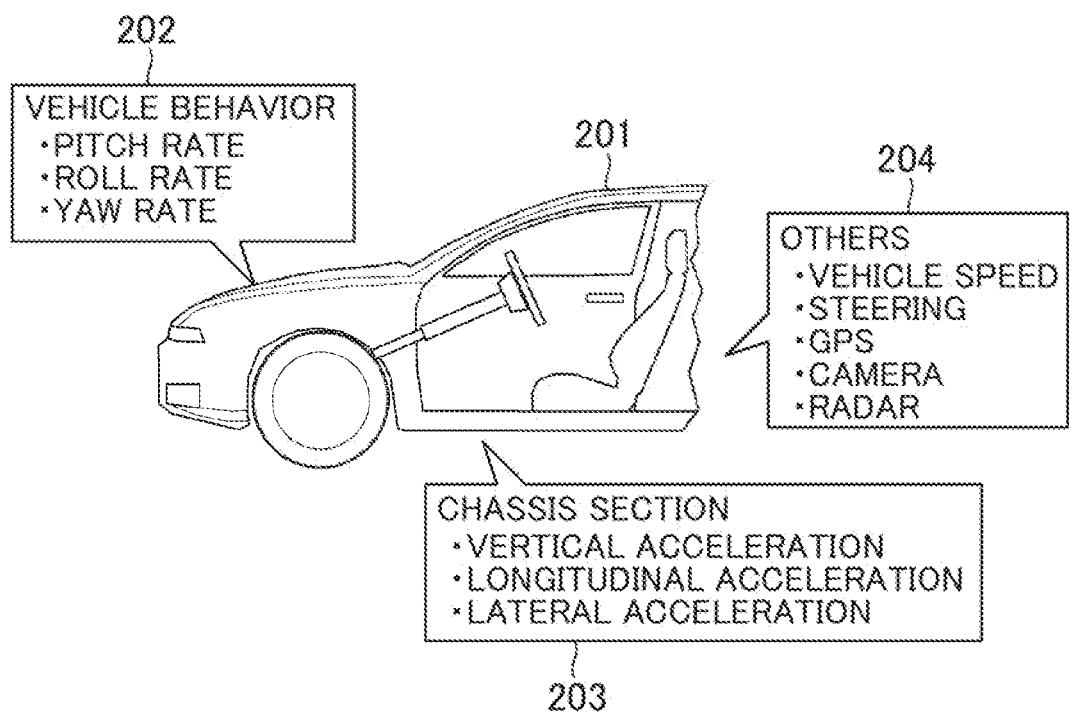
FIG. 4 is a drawing illustrating an example of data acquired by a sensor group installed in a vehicle.

FIG. 4 is a drawing illustrating an example of data acquired by the sensor group installed in a vehicle 201. The respective sensors illustrated in FIG. 4 measure behaviors of own vehicle and therefore can be referred to as "behavior sensors." A pitch rate, a roll rate, and a yaw rate indicated by a reference numeral 202 are an example of data acquired in vehicle behavior used for sensory evaluation prediction. A vertical acceleration, a longitudinal acceleration, and a lateral acceleration indicated by a reference numeral 203 are an example of data acquired by a chassis section used for sensory evaluation prediction. A vehicle speed, a steering, a GPS, a camera, and a radar indicated by a reference numeral 204 are example of data acquired by another member for sensory evaluation prediction.

Especially, a stimulus from a road surface is input to the chassis section via a tire, and all or a part of acceleration data regarding a route reaching the vehicle occupant is selected. Examples include a spring lower portion and a spring upper portion constituting a suspension, a component around a seat on which the vehicle occupant is seated, a tie rod of steering, and a steering. Further, although not illustrated in FIG. 4, information of an accelerator, a brake, or the like as an operation target of the driver may be able to be acquired. Note that when the sensory evaluation prediction for steering stability is achievable, a measurement point other than the parts listed here may be employed. Although the information acquired by the sensor group described in FIG. 4 is stored in the test result storage unit 102, the sensory evaluation prediction system 101 is not necessarily stored in the vehicle 201.

With reference to FIG. 5 to FIG. 8, an outline of a process that estimates the sensory index using two physical quantities will be described. Thereafter, with reference to FIG. 9, an outline of a process that estimates the sensory index using three physical quantities will be described. As described above, the correlation information shows the correlation in time series of the two or more physical quantity, and there may be a case where a correlation in time series of three or four or more physical quantities are shown. However, in FIG. 5 to FIG. 8, an example in which the sensory index is estimated using a correlation of two physical quantities, namely, a first physical quantity P1 and a second physical quantity P2, which is the simplest case, will be described.

FIG. 5 is a conceptual diagram illustrating creation of the correlation information showing the correlation between the two physical quantities. The upper portion in FIG. 5 is a time series drawing indicating the physical quantity P1 by the solid line and indicating the physical quantity P2 by the dashed line, and as it goes to the right side in the drawing, the time passes. Changes in the physical quantity P1 and the physical quantity P2 start at a time t0, and the time passes to a time t1, a time t2, a time t3, and a time t4. The lower portion of FIG. 5 shows the correlation relationship between the physical quantity P1 and the physical quantity P2 from the time t0 until each of the times from the times t1 to t4. The lower portion in FIG. 5 plots the value of physical quantity P1 on the horizontal axis and the value of the physical quantity P2 on the vertical axis.

For example, at the time t1, the plot is made in a first quadrant of a plot diagram, at the time t2, the plot is made toward a second quadrant of the plot diagram, at the time t3, the plot is made in a third quadrant, and at the time t4, the plot is made in a fourth quadrant. Continuation of them creates a scatter diagram that visualizes the correlation relationship between the physical quantity P1 and the physical quantity P2.

Figure 6A:
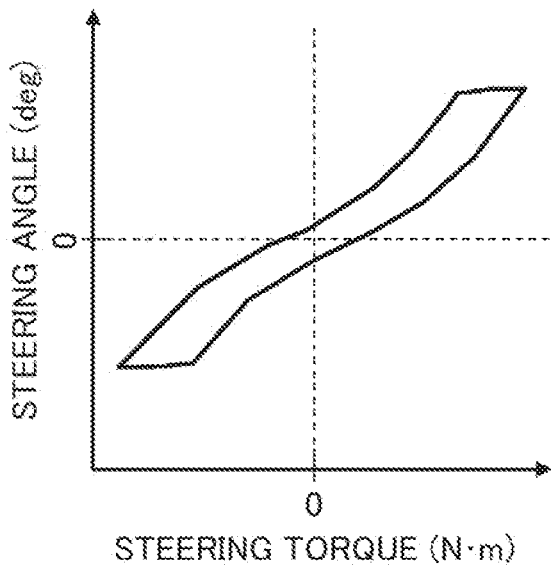
FIG. 6A is a diagram illustrating a correlation between a steering torque and a steering angle created by the method illustrated in FIG. 5.
Figure 6B:
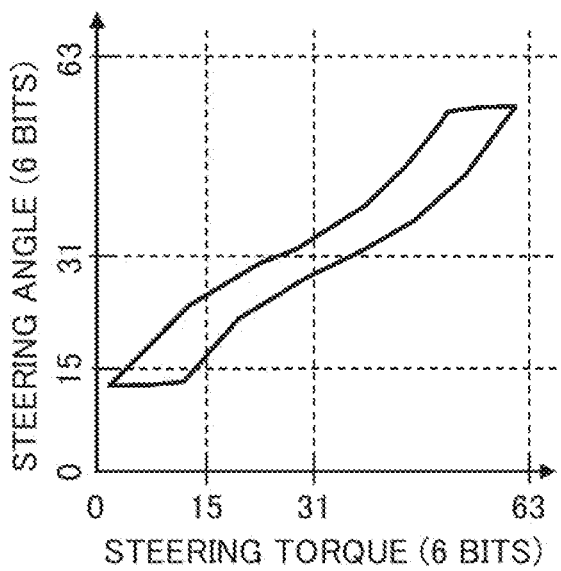
FIG. 6B is a diagram illustrating a state in which the information illustrated in FIG. 6A is divided vertically and horizontally at a resolution of 6 bits each.

FIG. 6(a) is a diagram illustrating a correlation between a steering torque and a steering angle created by the method illustrated in FIG. 5. FIG. 6(b) is a diagram illustrating a state in which the information illustrated in FIG. 6(a) is divided vertically and horizontally at a resolution of 6 bits each.

FIG. 6(b) will be described in detail. The steering torque indicated on the horizontal axis probably takes values on the positive side and the negative side around 0 [N·m]. Additionally, when the steering angle indicated on the vertical axis in the neutral steering state in which straight traveling is performed is set to 0 [deg], for example, the steering angle is expressed so as to have a positive value at steering to the right and have a negative value at steering to the left. When the respective 0 values are assigned to 31 (decadal system) in a digital 6-bit space, a scatter diagram in which the positive side and the negative side are balanced is created.

Note that the correlation creation unit 120 has a function that derives maximum values and minimum values of the physical quantities stored in the test result storage unit 102, for example, the steering angle and the steering torque assumed in a steering operation under a designated travel condition. The designated travel condition here means a condition, such as "slalom run at 0.2 Hz and the maximum lateral acceleration of 0.4 G under the condition of speed per hour of 100 kmh." Additionally, physical quantity data under the condition are acquired from the test result storage unit 102 to derive the maximum value and the minimum value by comparative calculation. The value of the larger absolute value among the maximum value and the minimum value is used to be normalized. Furthermore, when digitization in which "1" is set with plot and "0" is set without plot is performed, an image that allows confirmation of the whole trend while the 0 value is set to 31 (the decadal system) can be created.

More specifically, a raster image of 64 pixels in vertical and 64 pixels in horizontal and information in which the respective pixels express the presence/absence of plot by 1 and 0 is the correlation information. This correlation information is, for example, expressed as a 4096-dimensional column vector.

Figure 7:
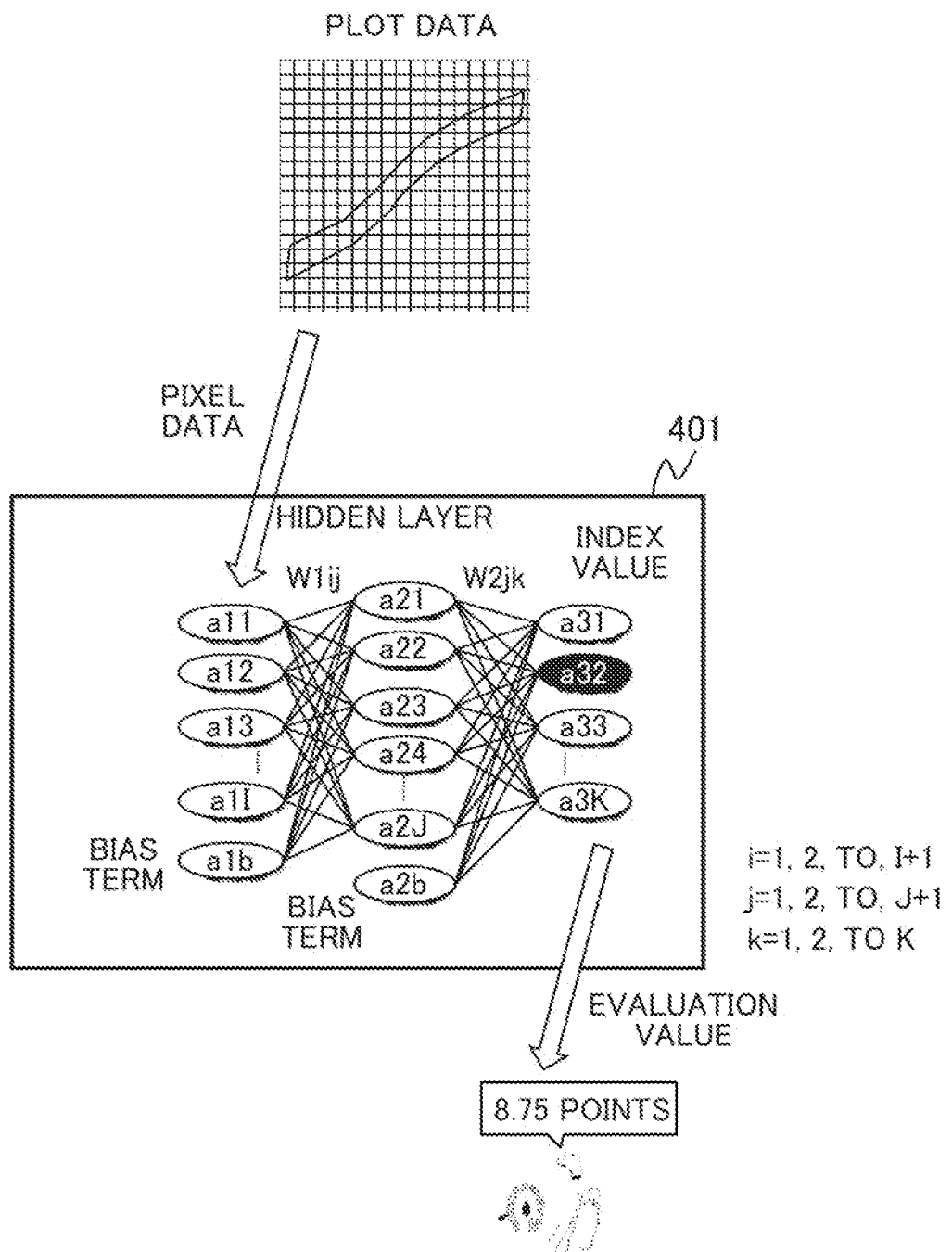
FIG. 7 is a conceptual diagram illustrating an operation of an evaluation circuit employing a hierarchical neural network.

FIG. 7 is a conceptual diagram illustrating the operation of the evaluation circuit 130 employing the hierarchical neural network. In FIG. 7, an evaluation circuit 401 equivalent to each of the evaluation circuits 130 illustrated in FIG. 1 is constituted by the hierarchical neural network having a three-layer configuration in which respective elements of an input layer (the number of elements I+1), a hidden layer (the number of elements J+1), and an output layer (the number of elements K) are hierarchically coupled. Note that as illustrated in FIG. 7 to each of the input layer and the hidden layer, one element representing a bias term is set. Each of the elements of the input layer is coupled to each of the elements of the hidden layer with weight W1ij (i=1 to I+1, j=1 to J+1), and each of the elements of the hidden layer is coupled to each of the elements of the output layer by weight W2jk (j=1 to J+1, k=1 to K). As described above, the weight parameter storage unit 109 stores the information of the weights.

As described in FIG. 6(b), when each of the physical quantities is expressed by 6 bits, the scatter diagram can be considered as a digital image of 64 pixels×64 pixels expressing the presence/absence of plot with the pixel values of 1 and 0. The information of the digital image is input to the evaluation circuit 401. Assuming that data conversion is performed with the 0 values of the respective physical quantities at the center of the digital space, the position of the pixel is meaningful, and therefore the pixel data itself is set to the input of the hierarchical neural network. As one example, inputs a11 toa1I of the hierarchical neural network are set in a dot-sequential manner from the pixel value at the upper left of the digital image to the lower right of the digital image. Assuming that all is the I-th input element, I=4096 (=64×64) is met. In this neural network, only any one of the elements of the output layer outputs "1" and the output layer elements other than that outputs "0."

Figures 8, 9:
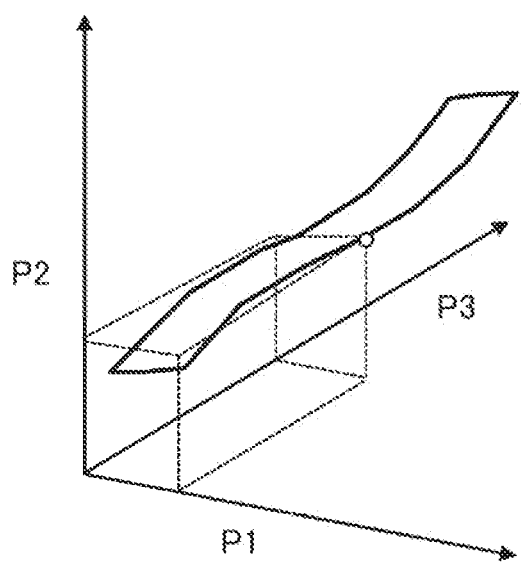
FIG. 8 is a drawing illustrating a relationship between outputs from the hierarchical neural network illustrated in FIG. 7 and sensory index values.
FIG. 9 is a diagram illustrating an example in which the correlation information is created using three types of physical quantities.

FIG. 8 is a drawing illustrating a relationship between outputs from the hierarchical neural network illustrated in FIG. 7 and sensory index values. The specifications of the output layer element are: the highest point of 8.00, the lowest point of 4.00, and the increment of the score of 0.25. The number of output layer elements K in this case is 17.

Determination of the weight parameter stored in the weight parameter storage unit 109, what is called learning of the evaluation circuit 401 is performed as follows. The learning target 1021 stored in the test result storage unit 102 includes a large number of combinations of sensor outputs while the expert driver gets in and the sensory index values answered by the expert driver. In a certain test run, when the expert driver answers the sensory index value of the N response as 7.75 points, learning is performed using the input value and the output value as the next combination. That is, for example, the input value is raster image information illustrated in FIG. 6(b) that plots the correlation in time series between the steering torque and the steering angle on the two-dimensional plane. Additionally, only the output value of an output layer element a32 corresponding to the 7.75 points is "1" and the output values of the output layer elements other than that is "0."

By using a large number of the combinations of the input values and the output values, the correlations between the large amount of time-series data and the sensory index values answered by the expert driver are learnt by hierarchical neural network. The generally known error backpropagation method (backpropagation) can be used as the learning method for the neural network.

FIG. 9 is a diagram illustrating an example in which the correlation information is created by selecting the three types of physical quantities. The example illustrated in FIG. 9 shows an example of combining the physical quantities P1 to P3, the physical quantity P1 is set to the X-axis, a physical quantity P3 is set to the Y-axis, and the physical quantity P2 is set to the Z-axis. The example illustrated in FIG. 6 is the correlation between the two physical quantities, and therefore the physical quantities are plotted on the two-dimensional plane. However, since FIG. 9 is the correlation between the three physical quantities, the plot is made on a three-dimensional space.

Then, the three-dimensional space is divided into voxels having predetermined sizes, and any of the values of "1" and "0" is set depending on the presence/absence of plot in the voxel. Further, the values of voxels output in the predetermined order are the correlation information. Since the process after the input of the created correlation information to the evaluation circuit 130 is as described in FIG. 8, the description will be omitted. Note that the four types or more of the physical quantities are difficult to be visualized, and therefore the description will be omitted here, but can be handled by the similar method and the number of types has no upper limit. For example, a correlation in time series between 10 types of physical quantities may be used as the correlation information.

Figures 10A, 10B:
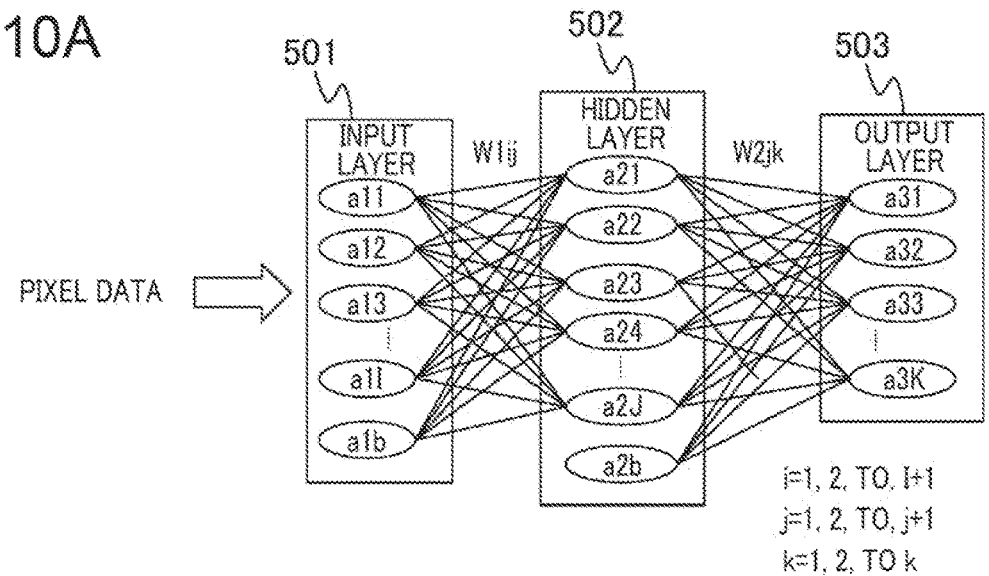
FIG. 10A and FIG. 10B include drawings illustrating an example of the evaluation circuit for each sensory index.

FIG. 10 includes drawings illustrating an example of the evaluation circuit for each sensory index. FIG. 10(a) is a diagram illustrating the relationship between an input layer, a hidden layer, and an output layer in the hierarchical neural network. FIG. 10(b) is a drawing illustrating an exemplary relationship between the sensory index, the two physical quantities for evaluation, the number of hidden layer elements, and the number of output layer elements. The evaluation circuit illustrated in FIG. 10(a) is, similarly to the evaluation circuit 401 in FIG. 7, constituted by the hierarchical neural network in which an input layer 501, a hidden layer 502, and an output layer 503 are coupled hierarchically. Note that in the sensory evaluation prediction system 101 of this embodiment, like the first evaluation circuit 131 to the fifth evaluation circuit 135 in FIG. 1, the evaluation circuit is set for each of the sensory indices. As described above, the specifications of the respective evaluation circuits may be the same or may be different.

FIG. 10(b) is a drawing illustrating an example of the specifications for each of the evaluation circuits. For example, the evaluation circuit corresponding to the N response, namely, the first evaluation circuit 131 in FIG. 1 uses the steering torque and the steering angle as the physical quantities for evaluation, and the number of hidden layer elements J=100. The evaluation circuit corresponding to the yaw response, namely, the second evaluation circuit 132 in FIG. 1 uses the steering angle and the yaw rate as the physical quantities for evaluation, and the number of hidden layer elements J=200. Additionally, the evaluation circuit corresponding to the grip feeling, namely, the third evaluation circuit 133 in FIG. 1 uses the yaw rate and the lateral acceleration as the physical quantities for evaluation, and the number of hidden layer elements J=250. The evaluation circuit corresponding to the roll feeling, namely, th fourth evaluation circuit 134 in FIG. 1 uses the lateral jerk as the physical quantity for evaluation and the number of hidden layer elements J=500. In all of the evaluation circuits, the number of output layer elements is K=17. However, the selection of the physical quantities and the parameters are one example, and other parameters may be used.

Figure 11:
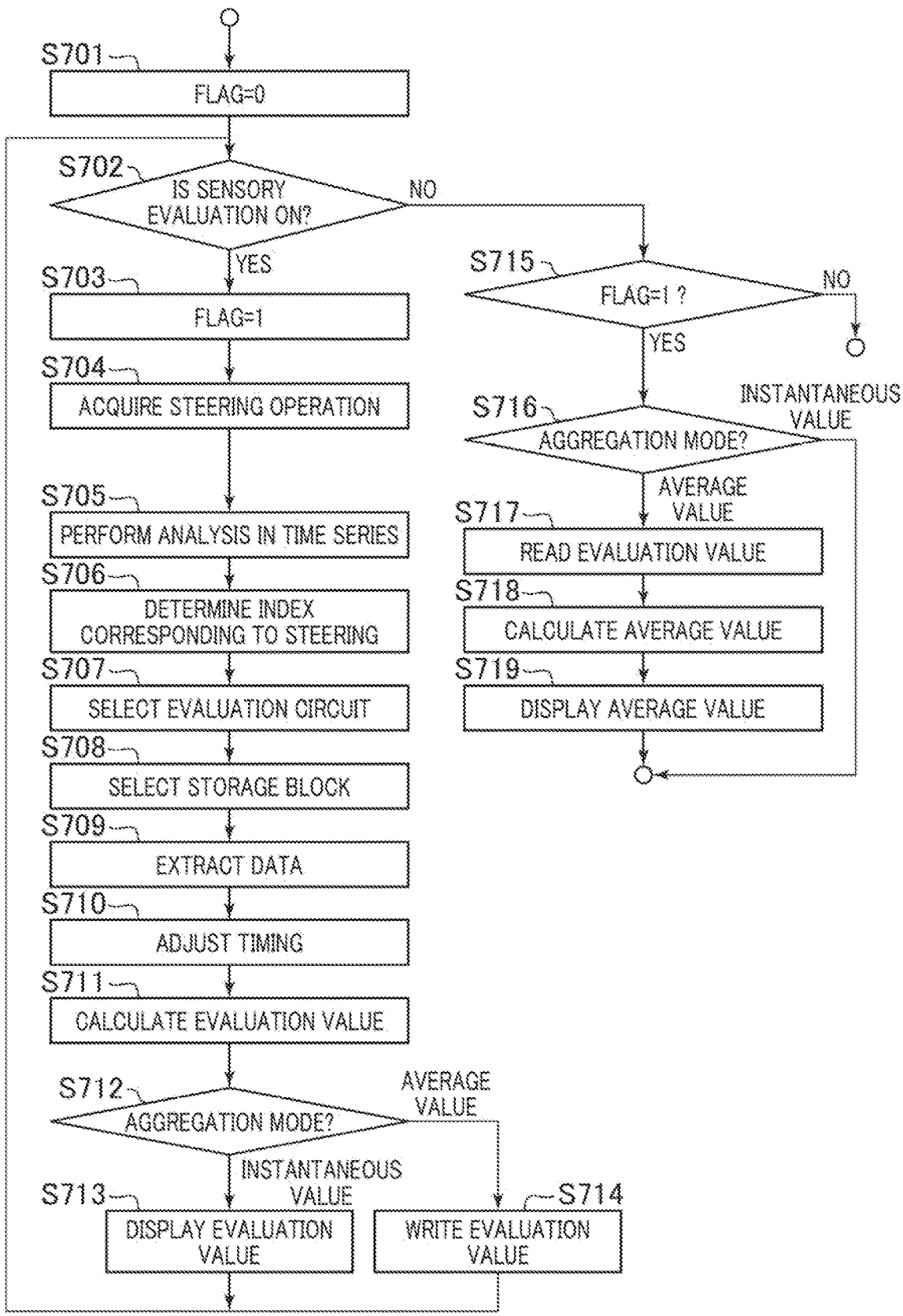
FIG. 11 is a flowchart depicting a flow of processes of the sensory evaluation prediction system according to the first embodiment of the invention.

FIG. 11 is a flowchart depicting a flow of processes of the sensory evaluation prediction system according to the first embodiment of the present invention. First, at Step S701, the control unit 103 sets "0," which represents that the sensory evaluation is not performed, to a flag value indicating an operating situation of sensory evaluation.

At Step S702, the control unit 103 determines whether sensory evaluation ON has been set by, for example, the operation by the vehicle occupant in own vehicle, that is, whether an operation command of sensory evaluation has been performed. In the case of the sensory evaluation ON, it is determined that the operation command of sensory evaluation has been performed and the process proceeds to Step S703. In the case of the sensory evaluation OFF, it is determined that the operation command of sensory evaluation has not been performed and the process proceeds to Step S715.

At Step S703, the control unit 103 sets "1," which represents the start of operation, to the above-described flag value, which indicates the operation situation of sensory evaluation. Next, the control unit 103 acquires steering operation information (Step S704), and analyzes the steering operation in time series (Step S705). At Step S706, the control unit 103 determines the sensory index corresponding to the steering operation using the evaluation index determination unit 106.

At Step S707, the control unit 103 selects the evaluation circuit corresponding to the sensory index determined as the evaluation index at Step S706 among the evaluation circuits 130 disposed for each of the sensory indices. At Step S708, the control unit 103 selects a storage area in the aggregation result storage unit 110 corresponding to the evaluation circuit selected at Step S707 as a storage block for evaluation value.

At Step S709, the selection unit 105 extracts the evaluation target 1022 in the test result storage unit 102 for a predetermined time range and creates time-series data used as data for evaluation. At Step S710, the selection unit 105 adjusts an operation start timing of the evaluation circuit 130 using nearby road surface information, vehicle speed information, and the like. Then, according to the timing after adjustment, the time-series data created at Step S709 is expanded as the data for evaluation to the evaluation circuit selected at Step S707.

At Step S711, the evaluation circuit selected at Step S707 among the evaluation circuits 130 calculates an evaluation value for the evaluation index determined at Step S706 based on the data for evaluation input from the selection unit 105 at Step S710.

At Step S712, the aggregation unit 108 determines whether a set aggregation mode is any of an instantaneous value aggregation mode and an average value aggregation mode based on the value of the aggregation mode setting 114. For example, when the value of the aggregation mode setting 114 is "0," the aggregation unit 108 determines that the instantaneous value aggregation mode is set and advances the process to Step S713. When the value the aggregation mode setting 114 is "1," the aggregation unit 108 determines that the average value aggregation mode is set and advances the process to Step S714.

At Step S713, the aggregation unit 108 transfers the evaluation value calculated at Step S711 to the display unit 111 to cause the display unit 111 to display it. Thus, the instantaneous value of the evaluation value for the evaluation index determined at Step S706 is output to outside using the display unit 111. Note that there may be a case where the change in the instantaneous value is too fast and therefore is difficult to be observed depending on the calculation cycle of the evaluation value. In the case, the average value may be calculated for a predetermined time and may be displayed instead of the instantaneous value.

At Step S714, the aggregation unit 108 writes the evaluation value calculated at Step S711 to the storage block selected at Step S708. When the process at Step S713 or Step S714 ends, the process returns to Step S702, and the above-described process is repeated. Thus, until it is determined that the sensory evaluation OFF is set at Step S702, a sequence of the processes from Step S703 to S714 is continuously performed.

At Step S702, when it is determined that the sensory evaluation OFF is set, at Step S715, the control unit 103 determines whether "1" is set to the above-described flag value indicating the operation situation of sensory evaluation. When "1" is set to the flag value, it is determined that the sensory evaluation has been already operated in the sequence of processes from Step S703 to S714 and the process proceeds to Step S716. When "0" is set to the flag value, it is determined that the sensory evaluation has not been operated and the process returns to Step S701.

At Step S716, similarly to Step S712 described above, the aggregation unit 108 determines whether the set aggregation mode is any of the instantaneous value aggregation mode and the average value aggregation mode. When the average value aggregation mode is set, the process proceeds to Step S717, and when the instantaneous value aggregation mode is set, the process proceeds to Step S701. At Step S717, the aggregation unit 108 reads the evaluation value stored in the aggregation result storage unit 110.

At Step S718, the aggregation unit 108 calculates the average value of the evaluation value for each evaluation index after starting the process in FIG. 11 based on the evaluation value read at Step S714. At the subsequent Step S719, the aggregation unit 108 transfers the average value calculated at Step S718 to the display unit 111 and causes the display unit 111 to display it. Accordingly, the average value of the evaluation value when own vehicle travels the road surface as the evaluation target is aggregated and is output to outside using the display unit 111. After the process at Step S719 ends, the process returns to Step S701.

Figure 12:
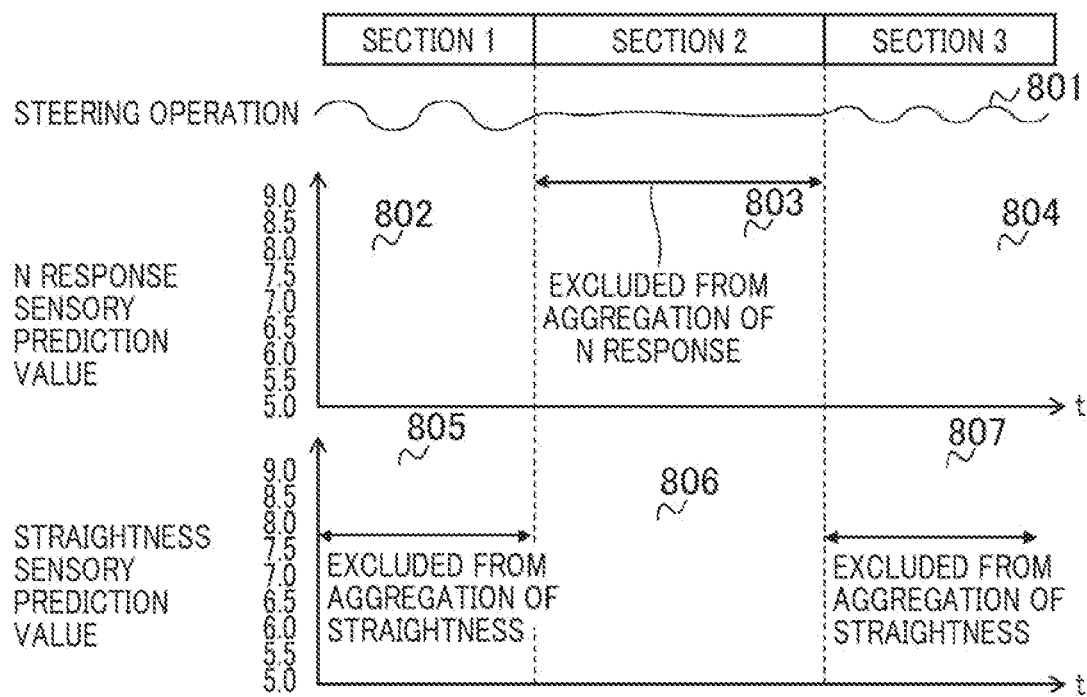
FIG. 12 is a drawing illustrating exemplary steering operation and output waveforms of the evaluation circuits of the evaluation circuits constituting the sensory evaluation prediction system in the first embodiment.

FIG. 12 is a drawing illustrating exemplary steering operation and output waveforms of the evaluation circuits of the evaluation circuits constituting the sensory evaluation prediction system in the first embodiment. Reference numeral 801 indicates the time series change in steering operation, and respective reference numerals 802 to 804 indicate sensory evaluation prediction waveforms of N response in a section 1 to a section 3. Respective reference numerals 805 to 807 indicate sensory evaluation prediction waveforms of straightness in the section 1 to the section 3.

In the example illustrated in FIG. 12, the evaluation target for the sensory index N response is in the section 1 and the section 3 that can be determined as a slalom run from the steering operation, and the section 2 in which only straight traveling is performed is excluded from the evaluation target. In the straightness as the sensory index, the section 1 and the section 3 are excluded from the evaluation target, and the section 2 is the evaluation target. The evaluation circuit targets the sensory index for steering stability and targets an event with fluctuation, and therefore it is predicted that a constant fixed value is not output. However, since assumed learning has not been performed in the steering operation excluded from the evaluation target, it is predicted that the waveform is saturated to the upper limit value as in a reference numeral 805 and a reference numeral 807, or the waveform largely varies as in the reference numeral 803.

In other words, reliability of the sensory evaluation prediction value during traveling in the steering operation excluded from the evaluation target is considered to be low. On the other hand, since the assumed learning has been performed in the steering operation as the evaluation target, a value in a certain range is considered to be output, and the waveforms, such as the reference numeral 802, the reference numeral 804, and a reference numeral 806, are expected. Accordingly, the evaluation index determination unit 106 determines whether each of the evaluation circuits 130 is the evaluation target or not using the steering information and eliminates the sensory evaluation prediction value in the steering operation excluded from the evaluation target.

Figure 13A:
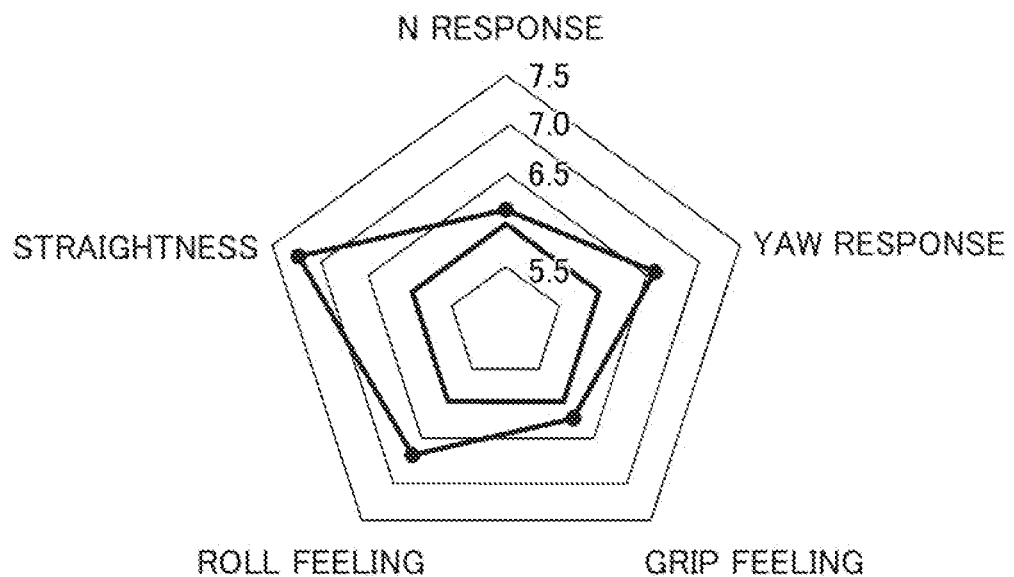
FIG. 13A and FIG. 13B include drawings illustrating examples of visualizing index values output by an aggregation unit constituting the sensory evaluation prediction system in the first embodiment.

FIG. 13 includes drawings illustrating examples of visualizing the index values output by the aggregation unit constituting the sensory evaluation prediction system. FIG. 13(a) is an example that visualizes the sensory evaluation prediction values for the five types of sensory indices and the graph type is a radar chart. Note that the sensory index to be visualized is selectable by a setting value (not illustrated) stored in the register 104. The setting values (not illustrated) are a collection of one-bit registers corresponding to the sensory indices, and is, for example, constituted by a N response selection register, a yaw response selection register, a grip feeling selection register, a roll feeling selection register, and a straightness selection register. When "1" is set as each of the register values, the sensory index is displayed, and when "0" is set as each of the register values, the sensory index is not displayed. Accordingly, the case of FIG. 13(a) shows the case where all of the register values of the five types of display selection registers are set as "1."

Additionally, aggregating methods of the sensory evaluation prediction values are differentiated based on the setting values of the aggregation mode setting 114. For example, when the register value of the aggregation mode setting 114 is "1," the sensory evaluation prediction value is the average value of the sensory evaluation prediction value during traveling in the steering operation as the evaluation target, and when the register value of the aggregation mode setting 114 is "0," the sensory evaluation prediction value is the instantaneous value during traveling in the steering operation as the evaluation target. This is merely an example, the register value that is possibly taken may be expanded, and treated as a moving average value, and further a register having a two-bit width or more to set a window width during calculation of the moving average may be set.

Figure 13B:
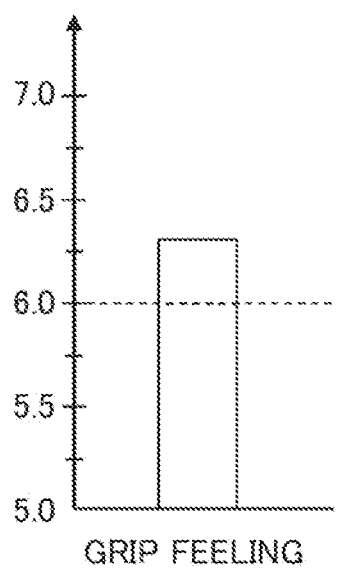

FIG. 13(b) is an example of visualizing one type of sensory index, the grip feeling, and the type of the graph is a bar chart. In this case, only the grip feeling selection register has the register value of "1," and the registers other than that is equivalent to the case of being set to non-display. Since the setting specifications of the aggregation mode setting 114 are similar to the case of FIG. 13(a) described above, the description will be omitted. Note that FIG. 13 displays the sensory index value with 6.0 points as the reference. Although "6.0" is not essential, it is important to visualize the sensory evaluation prediction value in the display specification for comparison with the reference point.

Figure 14:
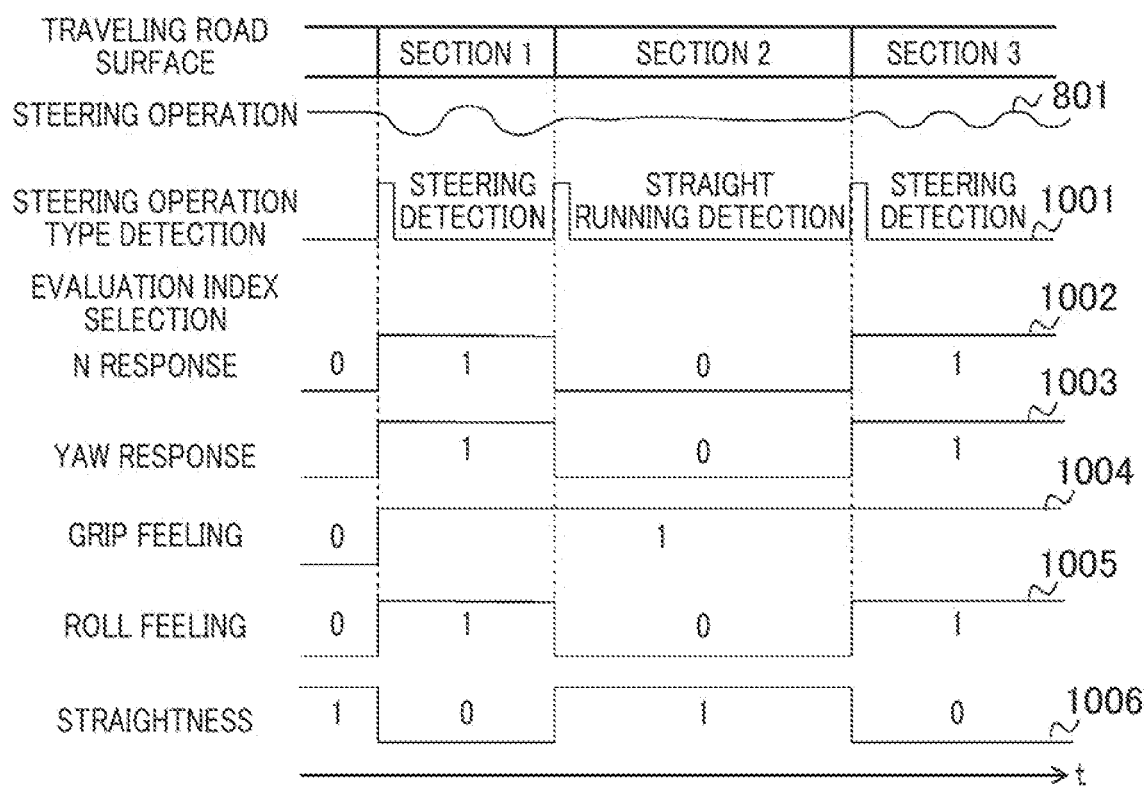
FIG. 14 is a timing chart illustrating an exemplary relationship between an operation of the evaluation circuit and a traveling road surface.

FIG. 14 is a timing chart illustrating an exemplary relationship between an operation of the evaluation circuit constituting the sensory evaluation prediction system according to the first embodiment and a traveling road surface.

Reference numeral 1001 indicates a steering operation type detection timing waveform, a reference numeral 1002 indicates an operation timing of evaluation circuit for N response, a reference numeral 1003 indicates an operation timing of evaluation circuit for yaw response, a reference numeral 1004 indicates an operation timing of evaluation circuit for grip feeling, a reference numeral 1005 indicates an operation timing of evaluation circuit for roll feeling, and a reference numeral 1006 indicates an operation timing of evaluation circuit for straightness.

First, the steering operation 801 transitions from the section 1 to the section 3 via the section 2. The steering operation information is acquired, and the evaluation index determination unit 106 detects the type of steering operation. In FIG. 14, the detection is performed at a timing when the pulse waveform of the reference numeral 1001 is High (1). At the section 1, the evaluation index determination unit 106 determines that the sensory evaluation is performed for the sensory indices, the N response, the yaw response, and the roll feeling, and outputs evaluation index selection signals 1002, 1004, and 1006 that become High (1) during traveling on the road surface as the evaluation target. Meanwhile, the evaluation index determination unit 106 outputs evaluation index selection signals 1003 and 1005 that become Low (0) for the grip feeling and the straightness excluded from the evaluation target.

The switching timing of the evaluation index selection signal is a timing of the steering operation type detection.

Note that FIG. 14 illustrates the evaluation index selection signals 1002 to 1006 assuming the case where the steering operation type is switched like the steering operation 801, but this is merely an example. There are a variety of ways of thinking of sensory indices, and the evaluation index selection signals are created according to the way of thinking.

Note that in this embodiment, for simplifying the contents for ease of understanding, the two-dimensional image formed of the two types of the physical quantity P1 and the physical quantity P2 has been mainly described. However, as long as good and bad of the sensory index for steering stability can be determined, it is not limited to the two-dimensional image, and may be a three-dimensional data space using the three types or more of physical quantities or may be a data space more than three dimensions. Especially, on the premise of a hierarchical neural network, an information volume is not necessarily reduced to an information volume that can be grasped by a person.

According to the above-described first embodiment, the following effects can be obtained.

(1) The sensory evaluation prediction system 101 includes the input unit 115, the selection unit 105, the correlation creation unit 120, and the evaluation circuit 130. The input unit 115 reads the output from the behavior sensor that measures two or more types of pieces of the time series information regarding the moving body. The selection unit 105 selects two or more types of the physical quantities from the output from the behavior sensor read by the input unit 115. The correlation creation unit 120 creates the information showing the correlation in time series between the two or more types of the physical quantities selected by the selection unit 105. The evaluation circuit 130 calculates the evaluation value of the sensor index based on the information showing the correlation in time series. Therefore, with the sensory evaluation prediction system 101, since the correlation of a plurality of the physical quantities is evaluated, a variation of an operation depending on a driver is less likely to be affected.

(2) The evaluation circuit 130 is configured to calculate the plurality of sensory indices. The sensory evaluation prediction system 101 includes the evaluation index determination unit 106 and the register 104. The evaluation index determination unit 106 determines the sensory index for the evaluation target based on the steering operation of the moving body. The register 104 is a storage unit that stores the data specification setting 113 that makes the two or more physical quantities correspond to the corresponding sensory index determined by the evaluation index determination unit 106. The selection unit 105 refers to the data specification setting 113 and determines the two or more physical quantities based on the determination by the evaluation index determination unit 106. This allows evaluating the steering stability for steering operation by the driver using the appropriate evaluation indices.

(3) When the selection unit 105 selects the two physical quantities, the correlation creation unit 120 plots the correlation in time series between the two physical quantities on the two-dimensional plane and outputs the plot as the raster image information. Therefore, the correlation in time series between the two physical quantities can be expressed in the simplified manner, and is robust against data variation. Outputting the plot as vector image information is also considered. However, considering the use to the input to input layer in the hierarchical neural network, the vector image information has low robustness and obtaining the stable output is difficult with the vector image information.

Therefore, as in this embodiment, the method that uses the raster image information, in other words, the value of each pixel for the input to the input layer is excellent.

(4) When the selection unit 105 selects the three physical quantities, the correlation creation unit 120 plots the correlation in time series between the three physical quantities on the three-dimensional space, and outputs the plot as voxel information. Therefore, the correlation in time series between the three physical quantities can be expressed in the simplified manner, and is robust against data variation.

(5) The evaluation circuit 130 includes a plurality of small evaluation circuits corresponding to the respective plurality of sensory indices, namely, the first evaluation circuit 131 to the fifth evaluation circuit 135. The control unit 103 stops any of the evaluation circuits 130 that does not calculate the sensory index based on the selection by the evaluation index determination unit 106. Therefore, power consumption can be reduced. This is especially effective when the sensory evaluation prediction system 101 is mounted on the vehicle.

(6) The data specification setting 113 has the combinations of the physical quantities different depending on the sensory indices. Therefore, the combination of the physical quantities optimal to each of the sensory indices can be used.

(7) The sensory evaluation prediction system 101 is mounted on the moving body. The input unit 115 reads the output from the behavior sensor mounted on the moving body. The sensory evaluation prediction system 101 includes the aggregation unit 108 that aggregates the calculation results by the evaluation circuits 130. The aggregation unit 108 is configured to switch between an instantaneous evaluation mode and a comprehensive evaluation mode. The instantaneous evaluation mode outputs the instantaneous value or the moving average value of the calculation result by the evaluation circuit 130. The comprehensive evaluation mode outputs the average value of the calculation results by the evaluation circuit for a predetermined period.

Modification 1

In the first embodiment described above, the evaluation index determination unit 106 determines the evaluation index based on the steering information using the method of pattern matching. However, the steering information and the evaluation index may be associated by an inference based on learning using the hierarchical neural network. In this hierarchical neural network, for example, the steering information in time series separated in units of certain periods is an input, and an element corresponding to each of the sensory indices is an element of the output layer. In a learning phase, the weight parameter is learnt such that the element corresponding to the sensory index answered by the expert driver becomes "1" and the others become "0."

According to this modification, the following effects can be obtained in addition to the effects of the first embodiment described above.

(8) The evaluation index determination unit 106 determines the relationship between the information of the steering operation and the sensory index based on the learning. While above-described pattern matching needs to determine whether it is the evaluation target or excluded from the evaluation target in advance, application of the hierarchical neural network has the following advantage. That is, teacher data can be acquired during a sensory evaluation test in which the expert driver drives, and the evaluation index selection suitable for the actual way of thinking can be achieved.

Modification 2

The sensory evaluation prediction system 101 need not include the test result storage unit 102 when mounted on the vehicle. In the case, the output from the sensor group mounted on the vehicle is input to the input unit 115.

Modification 3

The sensory evaluation prediction system 101 may evaluate only one sensory index. In the case, the sensory evaluation prediction system 101 need not include the evaluation index determination unit 106.

Second Embodiment

Figure 15:
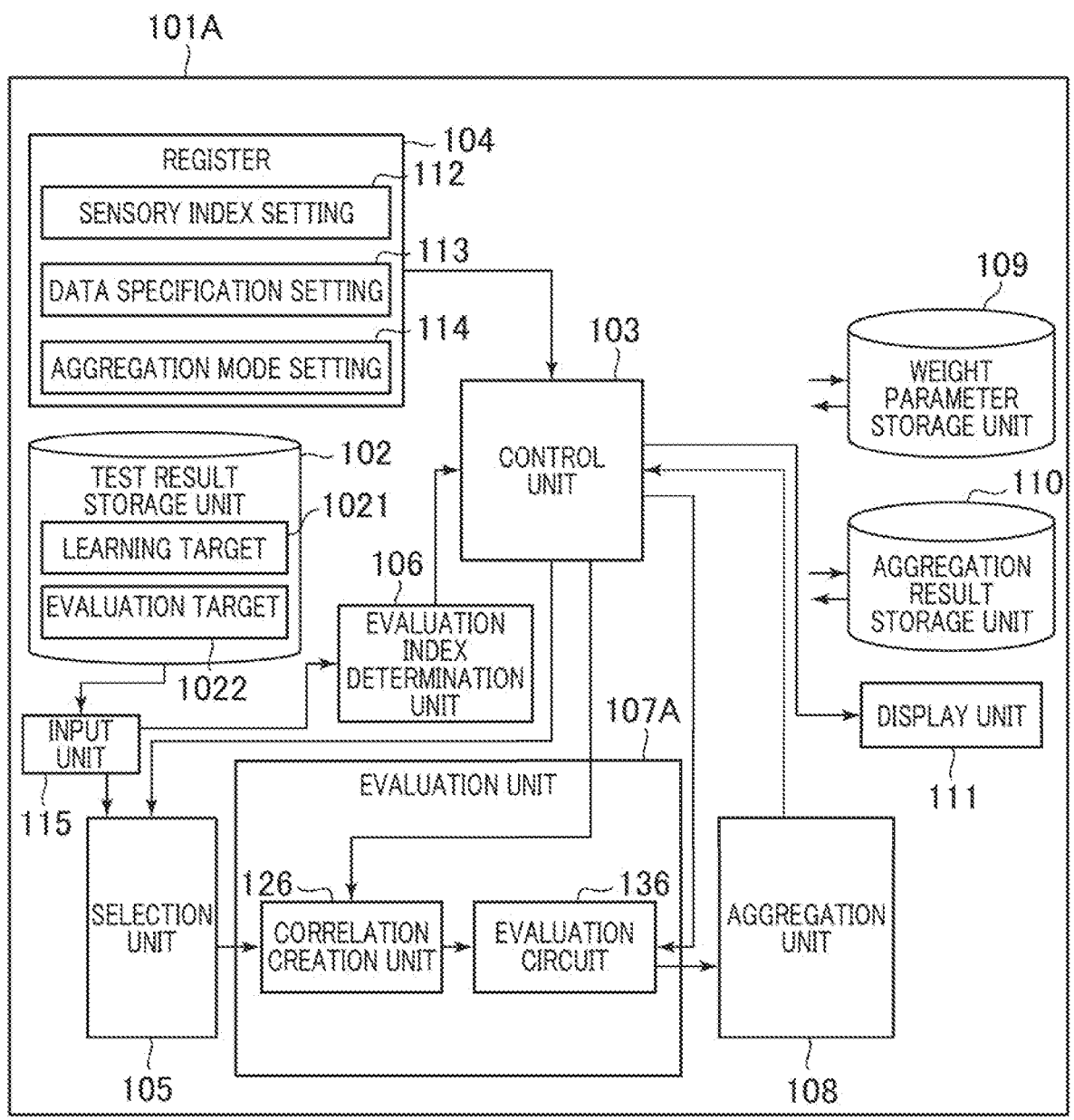
FIG. 15 is a block diagram of a sensory evaluation prediction system in a second embodiment.
Figure 16:
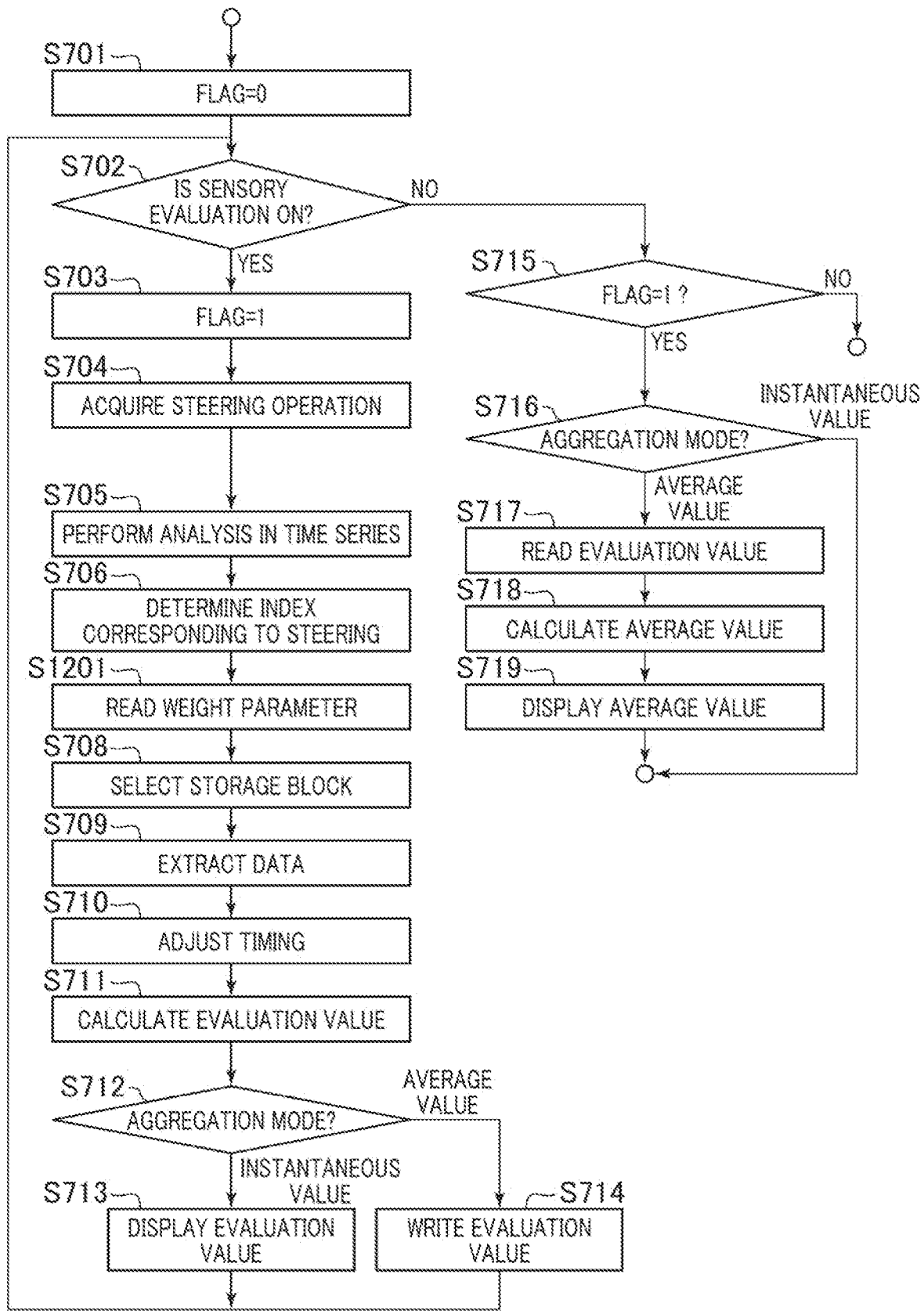
FIG. 16 is a flowchart depicting a flow of processes of the sensory evaluation prediction system according to the second embodiment.

With reference to FIG. 15 and FIG. 16, the second embodiment of a sensory evaluation prediction system will be described. In the following description, the same reference numerals are given to the components same as those of the first embodiment, and the differences will be mainly described. Points not specifically described are the same as those of the first embodiment. This embodiment mainly differs from the first embodiment in that one evaluation circuit is used in common for the plurality of sensory indices.

FIG. 15 is a block diagram of a sensory evaluation prediction system 101A in the second embodiment. The second embodiment differs from the first embodiment in that an evaluation unit 107A includes only a correlation creation unit 126 and an evaluation circuit 136.

The correlation creation unit 126 communalizes the first correlation creation unit 121 to the fifth correlation creation unit 125 described in FIG. 1 in the first embodiment. The correlation creation unit 126 acquires information of the evaluation index evaluated by the evaluation circuit 136 via the control unit 103 and creates correlation information in time series by targeting the plurality of physical quantities corresponding to the evaluation index. The correlation creation unit 126 outputs the created correlation information to the evaluation circuit 136. Note that while only one correlation creation unit 126 is illustrated in the example of FIG. 15, a plurality of the correlation creation units 126 may be present inside the evaluation unit 107A. At least one evaluation circuit 136 and one correlation creation unit 126 are used in common for two types or more of the sensory indices, any given number of the correlation creation units 126 can be disposed inside the evaluation unit 107A.

The evaluation circuit 136 commonalizes the first evaluation circuit 131 to the fifth evaluation circuit 135 for each of the sensory indices described in FIG. 1 in the first embodiment for a plurality of the sensory indices. That is, the correlation creation unit 126 and the evaluation circuit 136 are used in common for the above-described respective sensory indices, for example, the five types of sensory indices, which are the N response, the yaw response, the grip feeling, the roll feeling, and the straightness. Note that in the example of FIG. 15, only one evaluation circuit 136 is illustrated, but a plurality of the evaluation circuits 136 may be present inside the evaluation unit 107A. At least one evaluation circuit 136 is disposed in common for two types or more of the sensory indices, any given number of the evaluation circuits 136 can be used inside the evaluation unit 107A. Further, the number of the correlation creation units 126 need not be the same as that of the evaluation circuits 136.

FIG. 16 is a flowchart depicting a flow of processes of the sensory evaluation prediction system according to the second embodiment of the present invention. Compared with the flowchart in FIG. 11 described in the first embodiment, the flowchart in FIG. 16 differs in that Step S1201 is provided instead of Step S707. Note that, except for the processing step different from that of the first embodiment, the following will omit the description unless otherwise necessary.

At Step S1201, the control unit 103 reads the weight parameter of the evaluation circuit corresponding to the sensory index selected as the evaluation index at Step S706 from the weight parameter storage unit 109. Then, the read weight parameter is set to the evaluation circuit 136. Thus, the evaluation circuit 136 is adjusted according to the evaluation index in the evaluation unit 107A.

At Step S711, the evaluation circuit 136 adjusted according to the evaluation index at Step S1201 calculates the evaluation value for the evaluation index based on the data for evaluation input from the selection unit 105 at Step S710.

The second embodiment of the present invention described above provides the following effects in addition to the effects similar to the first embodiment.

(9) The evaluation circuit 130 includes a small evaluation circuit corresponding to the plurality of sensory indices in common, namely, the evaluation circuit 136. The evaluation circuit 136 is adjusted according to the evaluation index selected by the evaluation index determination unit 106, and the evaluation value is calculated using the adjusted evaluation circuit 136. Specifically, the evaluation circuit 136 is established using the neural network in which a plurality of elements are hierarchically coupled, and the weight parameter for each of the elements is adjusted according to the evaluation index. This allows achieving a reduction in circuit scale.

Third Embodiment

Figure 17:
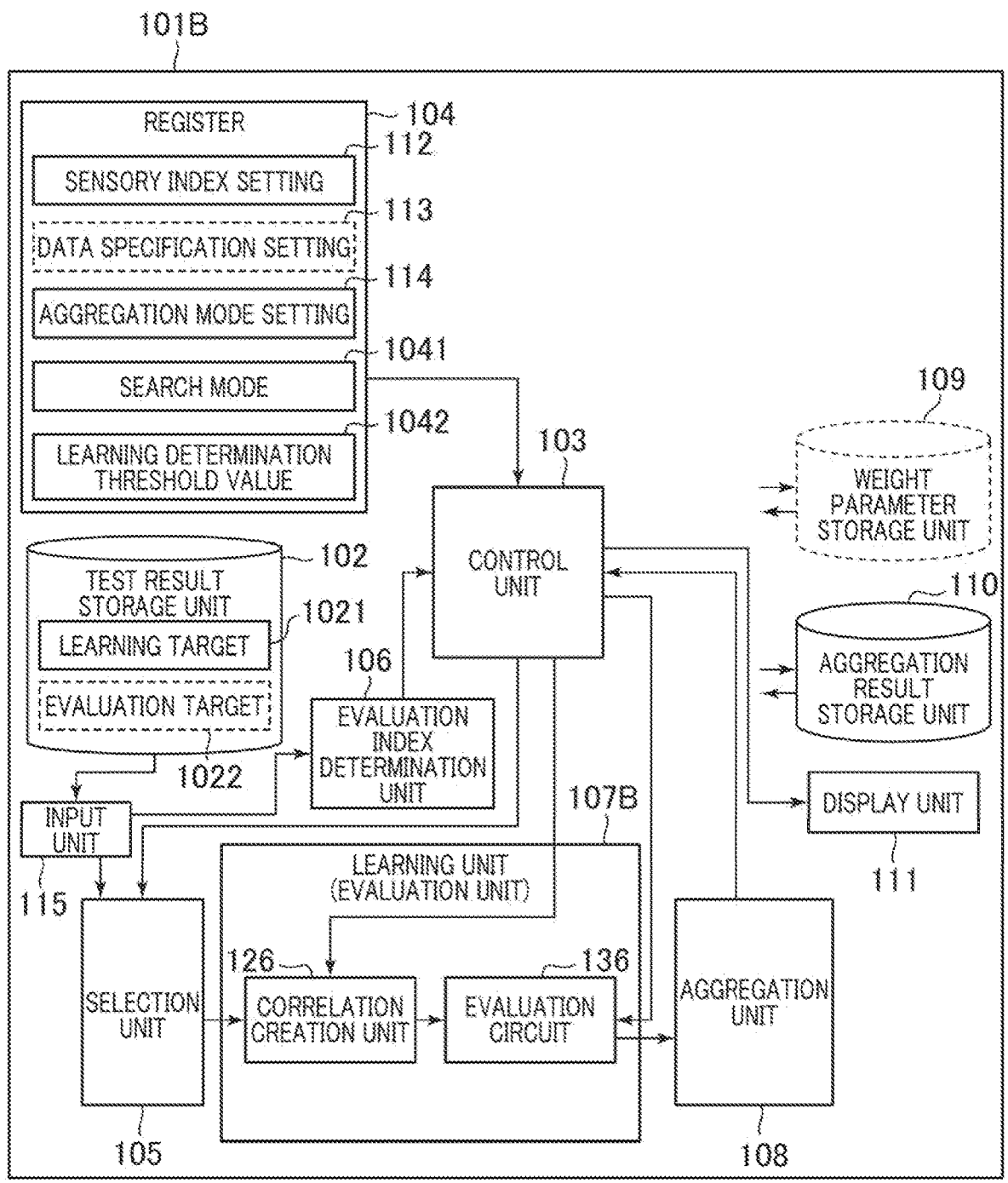
FIG. 17 is a block diagram of a sensory evaluation prediction system in a third embodiment.
Figure 18:
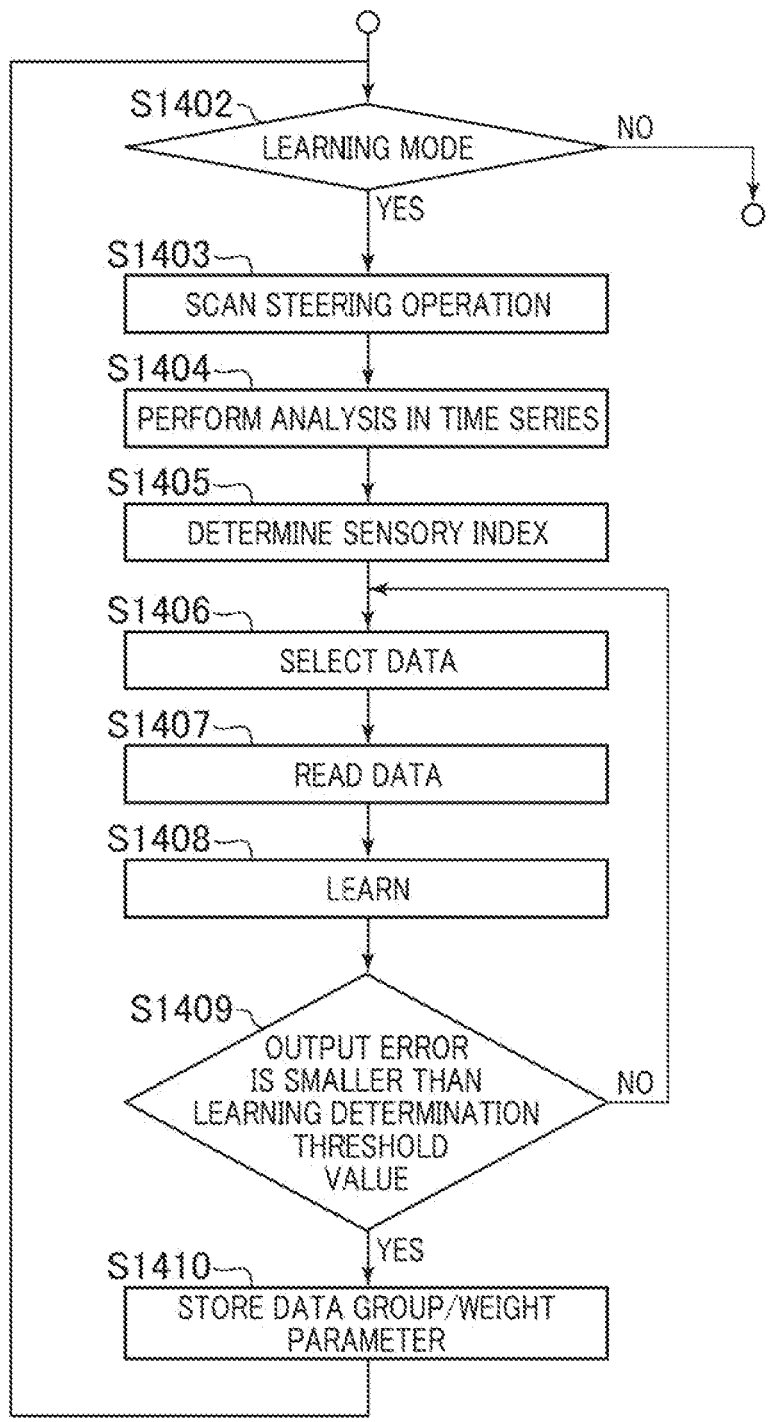
FIG. 18 is a flowchart depicting processes of a learning function of the sensory evaluation prediction system in the third embodiment.

With reference to FIG. 17 and FIG. 18, the third embodiment of a sensory evaluation prediction system will be described. In the following description, the same reference numerals are given to the components same as those of the first embodiment, and the differences will be mainly described. Points not specifically described are the same as those of the second embodiment. This embodiment mainly differs from the second embodiment in that the physical quantity used to estimate the sensory index is determined by learning and the data specification setting is created.

FIG. 17 is a block diagram of a sensory evaluation prediction system 101B in the third embodiment. In this embodiment, the register 104 further stores a search mode 1041 and a learning determination threshold value 1042. However, the register 104 need not store the data specification setting 113 at the time of starting a process described later, and the data specification setting 113 is created by the process described later. In this embodiment, at the time of starting the process described later, the weight parameter storage unit 109 need not store data, and the weight parameter storage unit 109 stores the data by the process described later.

When "1" is set to the search mode 1041, the sensory evaluation prediction system 101B transitions to the search mode and creates the data specification setting 113. When "0" is set to the search mode 1041, the sensory evaluation prediction system 101B transitions to a non-search mode, and performs the operations described in the first embodiment using the preliminarily created data specification setting 113 or the data specification setting 113 read from the outside.

In this embodiment, a learning unit 107B is disposed instead of the evaluation unit 107A. The learning unit 107B further includes a learning function, which will be described next, in addition to the function of the evaluation unit 107A in the second embodiment. The learning unit 107B performs the operation similar to that of the second embodiment in the non-search mode and achieves the learning function in the search mode.

The learning unit 107B in the search mode searches for the combination of the physical quantities used for estimation of the sensory index as follows. First, the learning unit 107B selects any arbitrary combination of the physical quantities and creates the first correlation information. Next, the learning unit 107B learns a relationship between the first correlation information and the sensory index value for steering stability acquired from the expert driver in the hierarchical neural network. Then, when an output error of the hierarchical neural network is smaller than the learning determination threshold value 1042, that is, when a difference with the teacher data decreases by a constant amount or more, the learning unit 107B determines that the learning is possible. The learning unit 107B records the combination of the physical quantities used for the first correlation information to the data specification setting 113, and stores the parameter obtained through the learning in the weight parameter storage unit 109.

On the other hand, the learning in the hierarchical neural network is attempted, when the output error of the hierarchical neural network is the learning determination threshold value 1042 or more, that is, the difference with the teacher data does not decrease by the constant amount or more, it is determined that the learning is impossible. In this case, the combination of the different physical quantities is selected, the second correlation information is created, and learning of the relationship between the second correlation information and the sensory index value for steering stability acquired from the expert driver is attempted in the hierarchical neural network. Thus, the combination of the physical quantities is searched until it is determined that the learning is possible.

Note that various methods can be employed as the search method for the combination of the physical quantities used to create the correlation information. For example, two or more types of a plurality of physical quantities may be randomly selected from a plurality of physical quantities, priority orders are given to the physical quantities by sensation of the expert driver, and the combination may be searched in high priority order. Furthermore, like reinforcement learning as one of Artificial Intelligence (AI), the search may be performed in trial and error through evaluation.

FIG. 18 is a flowchart depicting processes of a learning function of a sensory evaluation prediction system 101C in the third embodiment. First, at Step S1402, the control unit 103 determines whether the search mode 1041 is set to on by the operation by the vehicle occupant in own vehicle or the like, that is, whether the learning mode is set to be valid. When "1" is set to the search mode 1041, the control unit 103 determines that the operation command of learning has been performed, and advances the process to Step S1403, and when "0" is set to the search mode 1041, the process returns to Step S1402.

Subsequently, the control unit 103 acquires the steering operation information (Step S1403) and analyzes the steering operation in time series (Step S1404). At Step S1405, the control unit 103 determines the sensory index corresponding to the steering operation using the evaluation index determination unit 106.

At Step S1406, the control unit 103 determines the combination of the physical quantities corresponding to the sensory index determined at Step S1405. As described above, the combination of the physical quantities is, for example, randomly determined. At the subsequent Step S1407, the control unit 103 reads the information of the physical quantities determined at Step S1406 from the learning target 1021 in the test result storage unit 102 and the sensory index by the expert driver. At the subsequent Step S1408, the learning unit 107B learns using the physical quantities read at Step S1407 and the sensory index by the expert driver.

At Step S1409, the control unit 103 determines whether the output error is smaller than the learning determination threshold value 1042. When the control unit 103 determines that the output error is the learning determination threshold value 1042 or more, the control unit 103 returns the process to Step S1406, employs the different combination of the physical quantities, and advances the process to at and after Step S1407. When the control unit 103 determines that the output error is smaller than the learning determination threshold value 1042, the control unit 103 records the combination of the physical quantities determined at Step S1406 to the data specification setting 113, and stores the parameter obtained through the learning at Step S1408 in the weight parameter storage unit 109.

According to the third embodiment described above, the following effects can be obtained.

(10) The test result storage unit 102 stores the learning target 1021 as the combination of the output from the behavior sensor and the evaluation value of the sensory index. The learning unit 107B uses the learning target 1021 to learn the combination of the two or more types of the physical quantities used for the calculation of the evaluation value and included in the output from the behavior sensor. The learning unit 107B attempts the learning using the combination of the plurality of arbitrarily selected physical quantities. When the output error by the learning is smaller than the learning determination threshold value 1042, the learning unit 107B makes the sensory index correspond to the plurality of arbitrarily selected physical quantities and records it to the data specification setting 113. Therefore, while the learning of the hierarchical neural network in the evaluation circuit 130 is performed, the appropriate combination of the physical quantities can be searched. Further, this search helps solving the relationship between the steering operation. The vehicle behavior at the time, and the sensory evaluation by the vehicle occupant.

Fourth Embodiment

The fourth embodiment of the present invention will be described below with reference to FIG. 19. In this embodiment, an example of manufacturing a suspension device using the sensory evaluation prediction system will be described.

Figure 19:
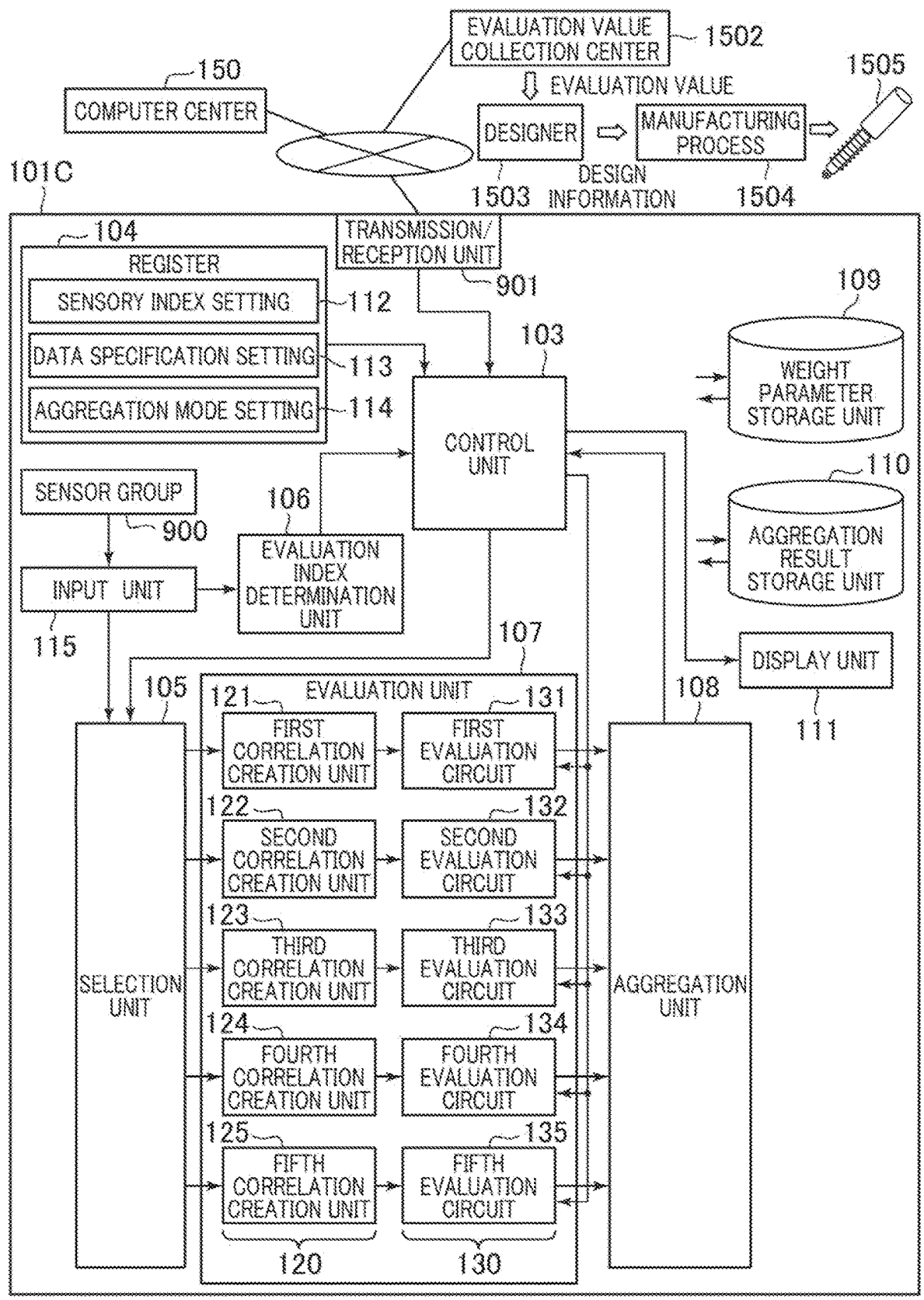
FIG. 19 is a block diagram illustrating a functional configuration of a sensory evaluation prediction system according to a fourth embodiment.

FIG. 19 is a block diagram illustrating a functional configuration of a sensory evaluation prediction system according to the fourth embodiment of the present invention. Compared with the sensory evaluation prediction system 101 in FIG. 1 described in the first embodiment, the sensory evaluation prediction system 101C illustrated in FIG. 19 differs in that the sensory evaluation prediction system 101C is mounted on a moving body, further includes a transmission/reception unit 901, and is connected to a computer center 150 and an evaluation value collection center 1502 via a network. Further, the sensory evaluation prediction system 101C includes a sensor group 900 instead of the test result storage unit 102.

The transmission/reception unit 901 is connected to the computer center 150 via the network, such as the Internet, receives learnt data, such as the weight parameter, transmitted from the computer center 150, and outputs it to the control unit 103. The learnt data includes, for example, evaluation index determination data used to select the sensory index (the evaluation index) as the evaluation target for each type of road surfaces among the plurality of types of the sensory indices by the evaluation index determination unit 106, the weight parameter stored in the weight parameter storage unit 109, and the data specification setting 113.

The sensor group 900 is, for example, an acceleration sensor, a gyro sensor, a vehicle speed sensor, a camera, and a laser range finder. The output from the sensor group 900 is input to the input unit 115.

The evaluation value collection center 1502 collects the evaluation values for the respective sensory indices calculated and aggregated by the sensory evaluation prediction system 101C by own vehicle traveling various roads and provides them to a designer 1503. Note that the evaluation value collection center 1502 may be connected to a plurality of the sensory evaluation prediction systems 101C mounted on the respective different vehicles, and may be able to collect the evaluation values from the respective sensory evaluation prediction systems 101C. The designer 1503 to whom the evaluation values are provided from the evaluation value collection center 1502 designs a suspension device 1505 with reference to the evaluation values, and provides design information to a manufacturing process 1504. The manufacturing process 1504 to whom the design information is provided manufactures the suspension device 1505 using the design information. This allows manufacturing the suspension device 1505 based on the evaluation values output from the sensory evaluation prediction system 101C.

Note that the example in which the suspension device 1505 is manufactured using the evaluation values output from the sensory evaluation prediction system 101C similarly to the sensory evaluation prediction system 101 described in the first embodiment has been described above. However, similarly to the sensory evaluation prediction systems 101A and 101B described in the respective second and third embodiments, the sensory evaluation prediction system 101C may be configured, and the suspension device 1505 may be manufactured using the evaluation values output from the sensory evaluation prediction system 101C.

According to the fourth embodiment of the present invention described above, the following effects can be obtained.

(11) The suspension device 1505 is manufactured based on the evaluation value output from the sensory evaluation prediction system 101C. Accordingly, the evaluation value for each of the sensory indices acquired for various roads can be easily reflected to manufacture the suspension device 1505. Therefore, the suspension device having high performance in improvement in a ride quality can be provided.

Modification 1 of Fourth Embodiment

Instead of the sensory evaluation prediction system 101C including the sensor group 900, the sensor group 900 may be mounted on a vehicle on which the sensory evaluation prediction system 101C is mounted. Instead of the sensory evaluation prediction system 101C including the display unit 111, the display unit 111 may be mounted on a vehicle on which the sensory evaluation prediction system 101C is mounted.

Fifth Embodiment

The fifth embodiment of the present invention will be described below with reference to FIG. 20. In this embodiment, an example of a control system configured to adjust a damping force of a suspension device using the sensory evaluation prediction system will be described.

Figure 20:
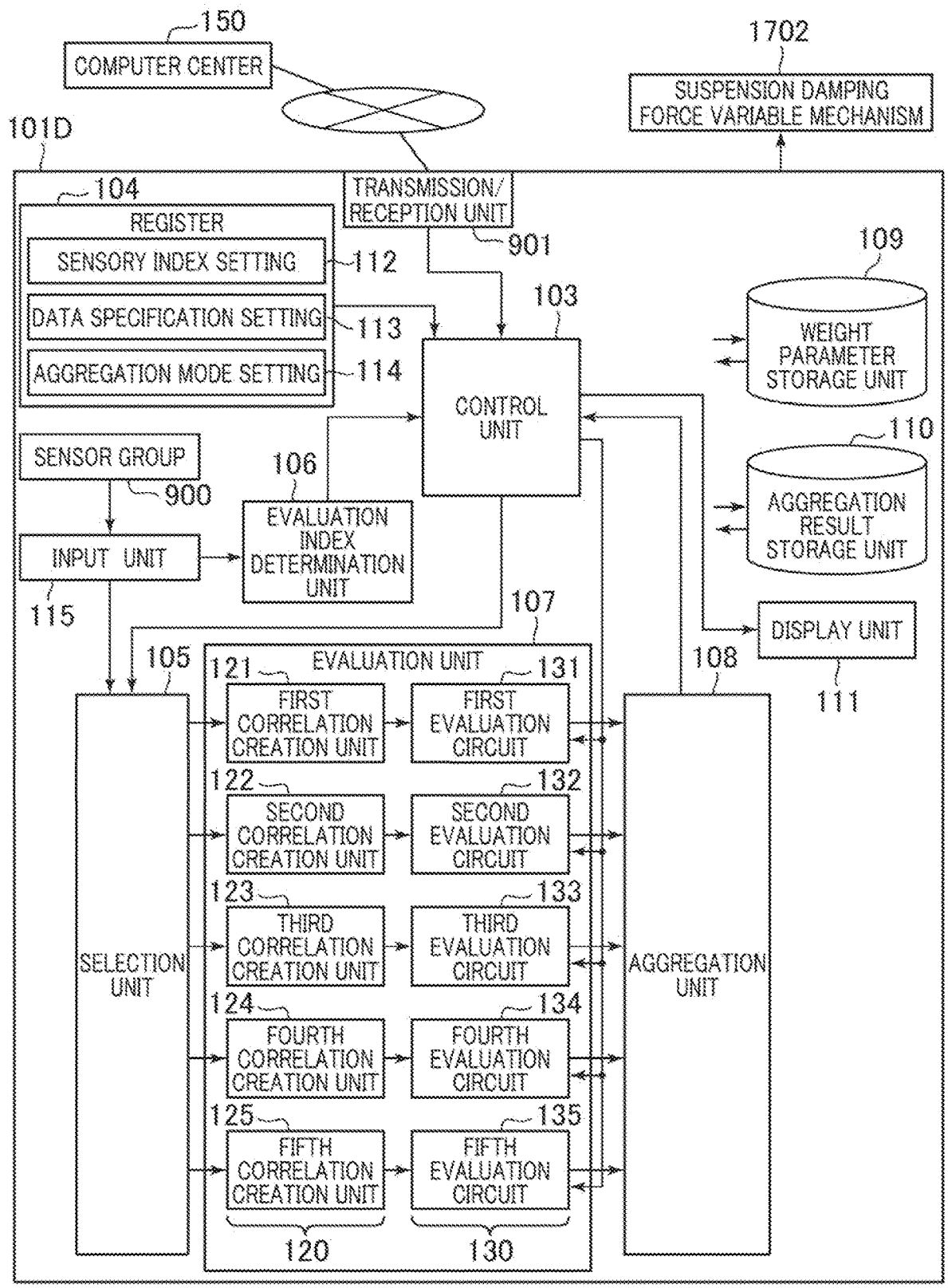
FIG. 20 is a block diagram illustrating a functional configuration of a suspension control system according to a fifth embodiment.

FIG. 20 is a block diagram illustrating a functional configuration of a suspension control system according to the fifth embodiment of the present invention. The suspension control system illustrated in FIG. 20 includes a sensory evaluation prediction system 101D and a suspension damping force variable mechanism 1702. Note that the configuration and the operation of the sensory evaluation prediction system 101D are similar to those of the sensory evaluation prediction system 101 in FIG. 1 described in the first embodiment.

The suspension damping force variable mechanism 1702 adjusts the damping force of a suspension device (not illustrated) mounted on own vehicle based on the evaluation value for each of the sensory indices output from the sensory evaluation prediction system 101D. For example, a control command value or a control parameter according to the evaluation value is set to the suspension device configured to adjust the damping force according to the control command value or the control parameter input from the outside. This allows reflecting the sensory evaluation result obtained by the sensory evaluation prediction system 101D and adjusting the suspension device.

Generally, the suspension device changes a damping force property according to an oil leakage and a secular change of a mechanical property, and provides an influence on a ride quality of an automobile in some cases. Therefore, in the suspension control system of this embodiment, when a change in the evaluation value is detected under a similar traveling environment in an automobile on which the sensory evaluation prediction system 101D is mounted, the suspension damping force variable mechanism 1702 adjusts the damping force of the suspension device so as to cancel the change. Thus, even when a failure or deterioration occurs in the suspension device, the property of the suspension can be corrected, thereby allowing lengthening the used time of the suspension device. Furthermore, the suspension property may be changed according to the type of the road surface on which own vehicle travels. This allows always providing an optimal ride quality regardless of the type of the road surface.

Note that the example in which the damping force of the suspension device is adjusted by the suspension damping force variable mechanism 1702 using the evaluation value output from the sensory evaluation prediction system 101D similarly to the sensory evaluation prediction system 101 described in the first embodiment has been described above. However, the sensory evaluation prediction system 101D may be configured similarly to the sensory evaluation prediction systems 101A and 101B described in the respective second and third embodiments and the damping force of the suspension device may be adjusted using the evaluation value output from the sensory evaluation prediction system 101D.

According to the fifth embodiment of the present invention described above, the following effects can be obtained.

(12) The suspension control system includes the sensory evaluation prediction system 101D and the suspension damping force variable mechanism 1702. The suspension damping force variable mechanism 1702 adjusts the damping force of the suspension device mounted on own vehicle based on the evaluation value output from the sensory evaluation prediction system 101D. This allows lengthening the used time of the suspension device and allows providing the suspension device configured to provide the optimal ride quality regardless of the type of the road surface.

The configuration of the function block in each of the embodiments and the modifications described above are merely an example. Some functional configurations described as different function blocks may be integrated, or the configuration expressed by one function block diagram may be divided into two or more functions. Additionally, another function block may include a part of the function that each of the function blocks has.

Each of the embodiments and the modifications described above may be combined. While the various embodiments and modifications have been described above, the present invention is not limited to these contents. Other aspects considered within the scope of the technical idea of the present invention are also included in the scope of the present invention.

This application is based upon, and claims the benefit of priority from, corresponding Japanese Patent Application No. 2020-11277 filed in the Japan Patent Office on Jan. 28, 2020, the entire contents of which are incorporated herein by reference.

LIST OF REFERENCE SIGNS 101, 101A, 101B, 101C, 101D sensory evaluation prediction system
102 test result storage unit
103 control unit
104 register
105 selection unit
106 evaluation index determination unit
107, 107A evaluation unit
107B learning unit
108 aggregation unit
109 weight parameter storage unit
110 aggregation result storage unit
111 display unit
112 sensory index setting
113 data specification setting
114 aggregation mode setting
115 input unit
120 correlation creation unit
130 evaluation circuit
201 vehicle
401 evaluation circuit
801 steering operation
1021 learning target
1022 evaluation target
1041 search mode
1042 learning determination threshold value
1504 manufacturing process
1505 suspension device
1702 suspension damping force variable mechanism

The invention claimed is:
1. A sensory evaluation prediction system comprising:
a display;

an input unit that reads an output from a behavior sensor that measures two or more types of pieces of time series information regarding a moving body;

a selection unit that selects two or more types of physical quantities from the output from the behavior sensor read by the input unit;

a correlation creation unit that creates information showing a correlation in time series between the two or more types of the physical quantities selected by the selection unit; and an evaluation circuit that calculates an evaluation value of a sensory index based on the information showing the correlation in time series, wherein the display is configured to display to a user an instantaneous version of the evaluation value and an average version of the evaluation value, when the instantaneous version is faster than a given threshold.

2. The sensory evaluation prediction system according to claim 1, wherein the evaluation circuit is configured to calculate a plurality of the sensory indices, the sensory evaluation prediction system further includes:

an evaluation index determination unit that determines the sensory index for an evaluation target based on a steering operation of the moving body; and a storage unit that stores a data specification setting that makes the two or more physical quantities correspond to the corresponding sensory index determined by the evaluation index determination unit, and the selection unit refers to the data specification setting and determines the two or more physical quantities based on the determination by the evaluation index determination unit.

3. The sensory evaluation prediction system according to claim 1, wherein when the selection unit selects two physical quantities, the correlation creation unit plots a correlation in time series between the two physical quantities on a two-dimensional plane and outputs the plot as raster image information.

4. The sensory evaluation prediction system according to claim 1, wherein when the selection unit selects three physical quantities, the correlation creation unit plots a correlation in time series between the three physical quantities on a three-dimensional space, and outputs the plot as voxel information.

5. The sensory evaluation prediction system according to claim 2, wherein the evaluation circuit includes a plurality of small evaluation circuits corresponding to the respective plurality of sensory indices, and the sensory evaluation prediction system further includes a control unit that stops the small evaluation circuit that does not calculate the sensory index based on a selection by the evaluation index determination unit.

6. The sensory evaluation prediction system according to claim 1, wherein the evaluation circuit includes a small evaluation circuit corresponding to the plurality of sensory indices in common, the small evaluation circuit is adjusted according to the evaluation index, and the evaluation value is calculated using the adjusted small evaluation circuit.

7. The sensory evaluation prediction system according to claim 2, wherein the evaluation index determination unit determines a relationship between information of the steering operation and the sensory index based on learning.

8. The sensory evaluation prediction system according to claim 2, wherein the data specification setting has combinations of the physical quantities different depending on the sensory indices.

9. The sensory evaluation prediction system according to claim 2, wherein the storage unit further stores a learning target as a combination of the output from the behavior sensor and the evaluation value of the sensory index, the sensory evaluation prediction system further includes a learning unit that uses the learning target to learn the combination of the two or more types of the physical quantities used for the calculation of the evaluation value and included in the output from the behavior sensor, and the learning unit attempts the learning using the combination of the plurality of arbitrarily selected physical quantities, and when an output error by the learning is smaller than a predetermined learning determination threshold value, the learning unit makes the sensory index correspond to the plurality of arbitrarily selected physical quantities and records the sensory index and the plurality of arbitrarily selected physical quantities to the data specification setting.

10. The sensory evaluation prediction system according to claim 1, wherein the sensory evaluation prediction system is mounted on the moving body, the input unit reads the output from the behavior sensor mounted on the moving body, the sensory evaluation prediction system further includes an aggregation unit that aggregates calculation results by the evaluation circuit, and the aggregation unit is configured to switch between an instantaneous evaluation mode and a comprehensive evaluation mode, the instantaneous evaluation mode outputs an instantaneous value or a moving average value of the calculation result by the evaluation circuit, and the comprehensive evaluation mode outputs an average value of the calculation result by the evaluation circuit for a predetermined period.

11. A suspension device manufactured based on the evaluation value output from the sensory evaluation prediction system according to claim 1.

12. A suspension control system comprising:

the sensory evaluation prediction system according to claim 1; and a suspension damping force variable mechanism that adjusts a damping force of a suspension device mounted on the moving body based on the evaluation value output from the sensory evaluation prediction system.

* * * * *